US012113283B2

(12) United States Patent
Zhang et al.

(10) Patent No.: US 12,113,283 B2
(45) Date of Patent: Oct. 8, 2024

(54) RADIATION APPARATUS AND MULTI-BAND ARRAY ANTENNA

(71) Applicant: Huawei Technologies Co., Ltd., Shenzhen (CN)

(72) Inventors: Xun Zhang, Chengdu (CN); Jianping Li, Shenzhen (CN); Xiaodeng Duan, Dongguan (CN); Wenao Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 17/405,868

(22) Filed: Aug. 18, 2021

(65) Prior Publication Data

US 2021/0376481 A1 Dec. 2, 2021

Related U.S. Application Data

(63) Continuation of application No. PCT/CN2019/122484, filed on Dec. 2, 2019.

(30) Foreign Application Priority Data

Feb. 19, 2019 (CN) ........................ 201910124410.X

(51) Int. Cl.
*H01Q 21/00* (2006.01)
*H01P 5/10* (2006.01)
(Continued)

(52) U.S. Cl.
CPC ........... *H01Q 21/0006* (2013.01); *H01P 5/10* (2013.01); *H01Q 1/12* (2013.01); *H01Q 1/36* (2013.01);
(Continued)

(58) Field of Classification Search
CPC ........ H01Q 21/0006; H01Q 1/12; H01Q 1/36; H01Q 5/48; H01Q 9/065; H01Q 19/108;
(Continued)

(56) References Cited

U.S. PATENT DOCUMENTS

2010/0245202 A1* 9/2010 Lewis .................... H01Q 23/00
343/859
2010/0271280 A1 10/2010 Pickles
(Continued)

FOREIGN PATENT DOCUMENTS

CN 102694237 A 9/2012
CN 102868017 A 1/2013
(Continued)

OTHER PUBLICATIONS

Sun et al., "A Base Station Antenna Element with Simple Structure but Excellent Performance," 3rd Australian Microwave Symposium, Total 2 pages, Brisbane, Australia, Institute of Electrical and Electronics Engineers, New York, New York (Feb. 6-7, 2018).

*Primary Examiner* — Hoang V Nguyen
*Assistant Examiner* — Yonchan J Kim
(74) *Attorney, Agent, or Firm* — Leydig, Voit & Mayer, Ltd.

(57) ABSTRACT

Embodiments of this application provide a radiation apparatus and a multi-band array antenna, and relate to the field of antenna technologies. The radiation apparatus includes a radiation module, a first conductor balun, and a second conductor balun. The first conductor balun is mechanically connected to the second conductor balun under the radiation module. The radiation module includes a first radiation unit and a second radiation unit in a +45° polarization direction, and a third radiation unit and a fourth radiation unit in a −45° polarization direction. The first conductor balun is configured to feed a first differential signal to the first radiation unit and the second radiation unit. The second conductor balun is
(Continued)

configured to feed a second differential signal to the third radiation unit and the fourth radiation unit. The first conductor balun and the second conductor balun are disposed in the same plane.

13 Claims, 15 Drawing Sheets

(51) Int. Cl.
*H01Q 1/12* (2006.01)
*H01Q 1/36* (2006.01)
*H01Q 19/10* (2006.01)
*H01Q 21/06* (2006.01)

(52) U.S. Cl.
CPC ......... *H01Q 19/108* (2013.01); *H01Q 21/062* (2013.01)

(58) Field of Classification Search
CPC ...... H01Q 21/062; H01Q 21/24; H01Q 21/26; H01Q 15/14; H01Q 1/50; H01Q 21/00; H01P 5/10
See application file for complete search history.

(56) References Cited

U.S. PATENT DOCUMENTS

| | | | | |
|---|---|---|---|---|
| 2014/0159965 | A1 | 6/2014 | Le | |
| 2014/0218253 | A1 | 8/2014 | Puzella et al. | |
| 2015/0070234 | A1 | 3/2015 | Jones | |
| 2017/0062940 | A1 | 3/2017 | Cao | |
| 2020/0099130 | A1 * | 3/2020 | Daojian | H01Q 1/48 |

FOREIGN PATENT DOCUMENTS

| | | | | |
|---|---|---|---|---|
| CN | 203491373 | U | 3/2014 | |
| CN | 103779658 | A | 5/2014 | |
| CN | 104916910 | A | 9/2015 | |
| CN | 206148623 | U | 5/2017 | |
| CN | 107134639 | A | 9/2017 | |
| CN | 207883897 | U | 9/2018 | |
| EP | 2232641 | A1 | 9/2010 | |
| GB | 2303740 | A * | 2/1997 | H01P 5/10 |
| JP | 5872018 | B1 | 3/2016 | |
| WO | 2009077791 | A1 | 6/2009 | |
| WO | 2014059946 | A1 | 4/2014 | |
| WO | 2018074378 | A1 | 4/2018 | |
| WO | 2018219321 | A1 | 12/2018 | |

* cited by examiner

RADIATION APPARATUS AND MULTI-BAND ARRAY ANTENNA

CROSS-REFERENCE TO RELATED APPLICATIONS

This application is a continuation of International Application No. PCT/CN2019/122484, filed on Dec. 2, 2019, which claims priority to Chinese Patent Application No. 201910124410.X, filed on Feb. 19, 2019. The disclosures of the aforementioned applications are hereby incorporated by reference in their entireties.

TECHNICAL FIELD

This application relates to the field of antenna technologies, and in particular, to a radiation apparatus and a multi-band array antenna.

BACKGROUND

With development of mobile communications technologies and update of communications systems, a multi-band array antenna that includes a plurality of radiation apparatuses and that allows coexistence of a plurality of generations of communications systems such as the second generation, the third generation, and the fourth generation is an important development trend. How to integrate more radiation apparatuses without increasing a size of the multi-band array antenna or through slightly increasing a size of the multi-band array antenna is a challenge for the mobile communications industry.

When the size is limited, to integrate more radiation apparatuses, it is necessary to reduce a distance between two adjacent radiation apparatuses. However, in the current technology, a structure of a feeding balun of the radiation apparatus has become a main factor in limiting the reduction of the distance between two adjacent radiation apparatuses. For example, FIG. 1 shows a radiation apparatus in the current technology. As shown in FIG. 1, the radiation apparatus includes a first radiation module 01, a second radiation module 02, a first conductor balun 03, and a second conductor balun 04. The first radiation module 01 is configured to perform −45° polarization, and the second radiation module 02 is configured to perform +45° polarization. The first conductor balun 03 is configured to feed the first radiation module 01, and the second conductor balun 04 is configured to feed the second radiation module 02. The first conductor balun 03 and the second conductor balun 04 are orthogonally disposed. In this way, a balun structure formed by the first conductor balun 03 and the second conductor balun 04 occupies relatively large space. When a multi-band array antenna is formed, a structure of the antenna array may be shown in FIG. 2. A distance between a radiation apparatus 001 operating on a relatively low frequency band and an adjacent radiation apparatus 002 operating on a relatively high frequency band is relatively large. This is inconvenient for a compact array layout.

SUMMARY

Embodiments of this application provide a radiation apparatus and a multi-band array antenna, to integrate more radiation apparatuses without increasing a size of the multi-band array antenna or through slightly increasing a size of the multi-band array antenna.

To achieve the foregoing objective, the following technical solutions are used in the embodiments of this application.

According to a first aspect, an embodiment of this application provides a radiation apparatus, including a radiation module, a first conductor balun, and a second conductor balun. The first conductor balun is mechanically connected to the second conductor balun under the radiation module. The radiation module includes a first radiation unit and a second radiation unit in a +45° polarization direction, and a third radiation unit and a fourth radiation unit in a −45° polarization direction. The first radiation unit, the second radiation unit, the third radiation unit, and the fourth radiation unit are isolated from each other. The first conductor balun is configured to feed a first differential signal to the first radiation unit and the second radiation unit. The second conductor balun is configured to feed a second differential signal to the third radiation unit and the fourth radiation unit. The first conductor balun and the second conductor balun are disposed in the same plane.

For the radiation apparatus provided in this embodiment of this application, the radiation apparatus includes the radiation module, the first conductor balun, and the second conductor balun. The first conductor balun and the second conductor balun are disposed under the radiation module. The radiation module includes the first radiation unit and the second radiation unit in the +45° polarization direction, and the third radiation unit and the fourth radiation unit in the −45° polarization direction. The first conductor balun is configured to feed the first differential signal to the first radiation unit and the second radiation unit. The second conductor balun is configured to feed the second differential signal to the third radiation unit and the fourth radiation unit. The first conductor balun and the second conductor balun are disposed in the same plane. Therefore, a balun structure formed by the first conductor balun and the second conductor balun occupies relatively small space. When the radiation apparatus is applied to a multi-band antenna array, a distance between the radiation apparatus with this structure and an adjacent radiation apparatus operating on a relatively high frequency band can be further reduced. In this way, more radiation apparatuses can be integrated without increasing a size of the multi-band array antenna or through slightly increasing a size of the multi-band array antenna.

Optionally, a first jack is disposed on the radiation module, and a first plug-connection protrusion is disposed on upper ends of the first conductor balun and the second conductor balun. The first plug-connection protrusion is fitted into the first jack. In this way, a mechanical connection between the radiation module and the first conductor balun and a mechanical connection between the radiation module and the second conductor balun are implemented. For a plug-connection operation, installation efficiency is relatively high.

Optionally, the first conductor balun and the second conductor balun each include a feeding conductor, a first reference ground conductor, a second reference ground conductor, and a fastener. The fastener is configured to fasten relative positions of the feeding conductor, the first reference ground conductor, and the second reference ground conductor. The feeding conductor includes a first feeding conductor segment and a second feeding conductor segment that extend in a vertical direction. The first feeding conductor segment and the second feeding conductor segment are arranged in parallel. A lower end of the first feeding conductor segment is a signal input end. An upper end of the second feeding conductor segment is electrically connected to an upper end of the first feeding conductor segment. The first reference ground conductor is parallel to the first feeding conductor segment. A capacitive coupling effect can be generated between the first reference ground conductor and the first feeding conductor segment. A lower end of the first reference ground conductor is a reference ground connection end, and an upper end of the first reference ground conductor is a first signal output end. The second reference ground conductor is parallel to the second feeding conductor segment. A capacitive coupling effect can be generated between the second reference ground conductor and the second feeding conductor segment. A lower end of the second reference ground conductor is a reference ground connection end, and an upper end of the second reference ground conductor is a second signal output end. The first signal output end and the second signal output end of the first conductor balun are respectively electrically connected to the first radiation unit and the second radiation unit. The first signal output end and the second signal output end of the second conductor balun are respectively electrically connected to the third radiation unit and the fourth radiation unit. In this way, when an excitation signal (for example, a current signal) is input from the signal input end to the feeding conductor, the excitation signal flows through the first feeding conductor segment to the second feeding conductor segment. The excitation signal in the first feeding conductor segment and the excitation signal in the second feeding conductor segment are equal in size but opposite in direction. A coupled signal in the first reference ground conductor and a coupled signal in the second reference ground conductor are equal in size but opposite in direction. In this case, the differential signals are output from the first signal output end and the second signal output end. The first conductor balun and the second conductor balun have a simple structure. In addition, a directivity pattern has relatively good symmetry.

Optionally, the feeding conductor further includes a third feeding conductor segment. The third feeding conductor segment extends in a horizontal direction. One end of the third feeding conductor segment is electrically connected to the upper end of the first feeding conductor segment, and the other end of the third feeding conductor segment is electrically connected to the upper end of the second feeding conductor segment. In this way, the feeding conductor has a simple structure with relatively low material consumption.

Optionally, the first feeding conductor segment and the second feeding conductor segment are located in the same plane. The plane in which the first feeding conductor segment and the second feeding conductor segment are located is a first plane. The first reference ground conductor and the second reference ground conductor are located in the same plane. The plane in which the first reference ground conductor and the second reference ground conductor are located is a second plane. The first plane is parallel to and opposite to the second plane. In the first conductor balun and the second conductor balun with this structure, the feeding conductor, the first reference ground conductor, and the second reference ground conductor are distributed in two parallel and opposite planes, to reduce a width of the first conductor balun and that of the second conductor balun, thereby further reducing space occupied by the balun structure formed by the first conductor balun and the second conductor balun.

Optionally, the feeding conductor, the first reference ground conductor, and the second reference ground conductor are located in the same plane. The first conductor balun and the second conductor balun have a simple structure and a simple manufacturing process.

Optionally, the fastener is a first insulating substrate that is vertically disposed. The feeding conductor, the first reference ground conductor, and the second reference ground conductor are metal layers disposed on the first insulating substrate. The fastener with this structure has a relatively small volume. The feeding conductor, the first reference ground conductor, and the second reference ground conductor may be formed on the first insulating substrate by using a printing process. The printing process is mature. Therefore, this structure is easy to manufacture.

Optionally, the fastener includes a fastener substrate. A first slot, a second slot, and a third slot are disposed on the fastener substrate. The feeding conductor is clamped in the first slot. The first reference ground conductor is clamped in the second slot. The second reference ground conductor is clamped in the third slot. In this way, the relative positions of the feeding conductor, the first reference ground conductor, and the second reference ground conductor are fastened by using the fastener substrate and the first slot, the second slot, and the third slot that are disposed on the fastener substrate. A connection between the fastener substrate and the feeding conductor, a connection between the fastener substrate and the first reference ground conductor, and a connection between the fastener substrate and the second reference ground conductor are detachable. Therefore, when any one of the fastener substrate, the feeding conductor, the first reference ground conductor, and the second reference ground conductor is damaged, the damaged component can be detached for repair or replacement. Therefore, maintenance costs are relatively low. In addition, a clamping operation is convenient, and efficiency of installation and detachment is relatively high.

Optionally: the fastener of the first conductor balun is formed integrally with the fastener of the second conductor balun. In this way, a quantity of components included in the radiation apparatus can be reduced, installation efficiency can be improved, and manufacturing costs can be reduced.

Optionally, the first conductor balun and the second conductor balun each include a feeding conductor, a reference ground conductor, and a fastener. The fastener is configured to fasten relative positions of the feeding conductor and the reference ground conductor. The feeding conductor extends in a vertical direction. A lower end of the feeding conductor is a signal input end, and an upper end of the feeding conductor is a first signal output end. The reference ground conductor is parallel to the feeding conductor. A capacitive coupling effect can be generated between the reference ground conductor and the feeding conductor. A lower end of the reference ground conductor is a reference ground connection end, and an upper end of the reference ground conductor is a second signal output end. The first signal output end and the second signal output end of the first conductor balun are respectively electrically connected to the first radiation unit and the second radiation unit. The first signal output end and the second signal output end of the second conductor balun are respectively electrically connected to the third radiation unit and the fourth radiation unit. In this way, when an excitation signal (for example, a current signal) is input from the signal input end to the feeding conductor, the first signal output end at the upper end of the feeding conductor outputs a path of signal in the differential signal. The reference ground conductor is coupled to the feeding conductor. The second signal output end at the upper end of the reference ground conductor outputs the other path of signal in the differential signal. The first conductor balun and the second conductor balun have a simple structure and relatively low costs.

Optionally, the reference ground conductor includes a first reference ground conductor unit and a second reference ground conductor unit that extend in a vertical direction. An upper end of the first reference ground conductor unit is electrically connected to an upper end of the second reference ground conductor unit, and a lower end of the first reference ground conductor unit is electrically connected to a lower end of the second reference ground conductor unit. The first reference ground conductor unit and the second reference ground conductor unit are disposed symmetrically relative to the feeding conductor. In this way, symmetry of a directivity pattern can be improved.

Optionally, the feeding conductor, the first reference ground conductor unit, and the second reference ground conductor unit are all strip conductors. The feeding conductor, the first reference ground conductor unit, and the second reference ground conductor unit are disposed in the same plane. The first conductor balun and the second conductor balun have a simple structure and a simple manufacturing process.

Optionally, the feeding conductor, the first reference ground conductor unit, and the second reference ground conductor unit are all strip conductors. A plane in which the feeding conductor is located is a third plane. A plane in which the first reference ground conductor unit is located is a fourth plane. A plane in which the second reference ground conductor unit is located is a fifth plane. The fourth plane and the fifth plane are respectively located on two opposite sides of the third plane. The fourth plane and the fifth plane are both parallel to and opposite to the third plane. In the first conductor balun and the second conductor balun with this structure, the feeding conductor, the first reference ground conductor unit, and the second reference ground conductor unit are respectively distributed on three parallel and opposite planes, to reduce a width of the first conductor balun and that of the second conductor balun, thereby further reducing space occupied by the balun structure formed by the first conductor balun and the second conductor balun.

Optionally, the radiation apparatus further includes a substrate. The substrate is mechanically connected to lower ends of the first conductor balun and the second conductor balun. The substrate includes a reference ground, a first feeding terminal, and a second feeding terminal that are isolated from each other. The reference ground connection end of the first conductor balun and the reference ground connection end of the second conductor balun are both electrically connected to the reference ground. The signal input end of the first conductor balun is electrically connected to the first feeding terminal. The signal input end of the second conductor balun is electrically connected to the second feeding terminal. In this way, the first conductor balun, the second conductor balun, and the radiation module can be supported by using the substrate. In addition, the first feeding terminal and the second feeding terminal are disposed on the substrate, to facilitate access of a feeding cable.

Optionally, a second jack is disposed on the substrate, and a second plug-connection protrusion is disposed on the lower ends of the first conductor balun and the second conductor balun. The second plug-connection protrusion is fitted into the second jack. Therefore, a mechanical connection between the first conductor balun and the substrate and a mechanical connection between the second conductor balun and the substrate are implemented. For a plug-connection operation, installation efficiency is relatively high.

Optionally, the substrate further includes a second insulating substrate that is horizontally disposed. The reference ground is a metal layer disposed on one surface of an upper surface and a lower surface of the second insulating substrate. The first feeding terminal and the second feeding terminal are metal layers disposed on the other surface of the upper surface and the lower surface of the second insulating substrate. In this way, the first feeding terminal, the second feeding terminal, and the reference ground are isolated from each other by using the second insulating substrate. In addition, the reference ground, the first feeding terminal, and the second feeding terminal may be formed on the second insulating substrate by using a printing process. The printing process is mature. Therefore, this structure is easy to manufacture.

Optionally, the substrate includes a first coaxial feeder and a second coaxial feeder. The first coaxial feeder is located below the first conductor balun. The second coaxial feeder is located below the second conductor balun. The reference ground is an external conductor of the first coaxial feeder and an external conductor of the second coaxial feeder. The first feeding terminal is an inner conductor of the first coaxial feeder. The second feeding terminal is an inner conductor of the second coaxial feeder. The structure is simple and is easy to implement.

Optionally, the radiation module further includes a third insulating substrate that is horizontally disposed. The first radiation unit, the second radiation unit, the third radiation unit, and the fourth radiation unit are a metal layer disposed on an upper surface of the third insulating substrate. The radiation module with this structure has a relatively small volume. The first radiation unit, the second radiation unit, the third radiation unit, and the fourth radiation unit may be formed on the third insulating substrate by using a printing process. The printing process is mature. Therefore, this structure is easy to manufacture.

According to a second aspect, an embodiment of this application provides a multi-band array antenna, including a reflection panel and a radiation apparatus array disposed on the reflection panel. The radiation apparatus array includes a first radiation apparatus and a second radiation apparatus that are disposed adjacent to each other. A frequency band in which the first radiation apparatus operates is higher than a frequency band in which the second radiation apparatus operates. The second radiation apparatus is the radiation apparatus described in any one of the foregoing technical solutions.

For the multi-band array antenna provided in this embodiment of this application, the multi-band array antenna includes the reflection panel and the radiation apparatus array disposed on the reflection panel. The radiation apparatus array includes the first radiation apparatus and the second radiation apparatus that are disposed adjacent to each other. The frequency band in which the first radiation apparatus operates is higher than the frequency band in which the second radiation apparatus operates. Therefore, a volume of the first radiation apparatus is smaller than a volume of the second radiation apparatus. Baluns of the first radiation apparatus and the second radiation apparatus are aligned with each other. Because the second radiation apparatus is the radiation apparatus described in any one of the foregoing technical solutions, a first conductor balun and a second conductor balun of the second radiation apparatus are disposed in the same plane. A balun structure formed by the first conductor balun and the second conductor balun occupies relatively small space, to facilitate reduction of a distance between the first radiation apparatus and the second radiation apparatus. Therefore, more radiation apparatuses can be integrated without increasing a size of the multi-band array antenna or through slightly increasing a size of the multi-band array antenna.

DESCRIPTION OF EMBODIMENTS

In descriptions of this application, it should be understood that a direction or a position relationship indicated by terms such as "center", "upper", "lower", "front", "back". "left", "right", "vertical", "horizontal", "top", "bottom", "inside", or "outside" is a direction or a position relationship shown based on the accompanying drawings, is merely used to facilitate descriptions of this application and simplify the descriptions, but is not intended to indicate or imply that an indicated apparatus or element needs to have a particular direction, and needs to be constructed and operated in a particular direction, and therefore cannot be construed as a limitation on this application.

The terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of this application, unless otherwise stated, "a plurality of" means two or more than two.

In the embodiments of this application, a balun indicates a device that can implement conversion between a single ended signal and a differential signal, and a conductor balun indicates a balun that includes a plurality of conductors and a fastening structure that is configured to fasten relative positions of the plurality of conductors. The plurality of conductors may be arranged in one plane, two parallel and opposite planes, or three or more parallel and opposite planes. The plurality of conductors may be microstrips, coplanar lines, or strip lines. This is not specifically limited herein.

Figure 1:
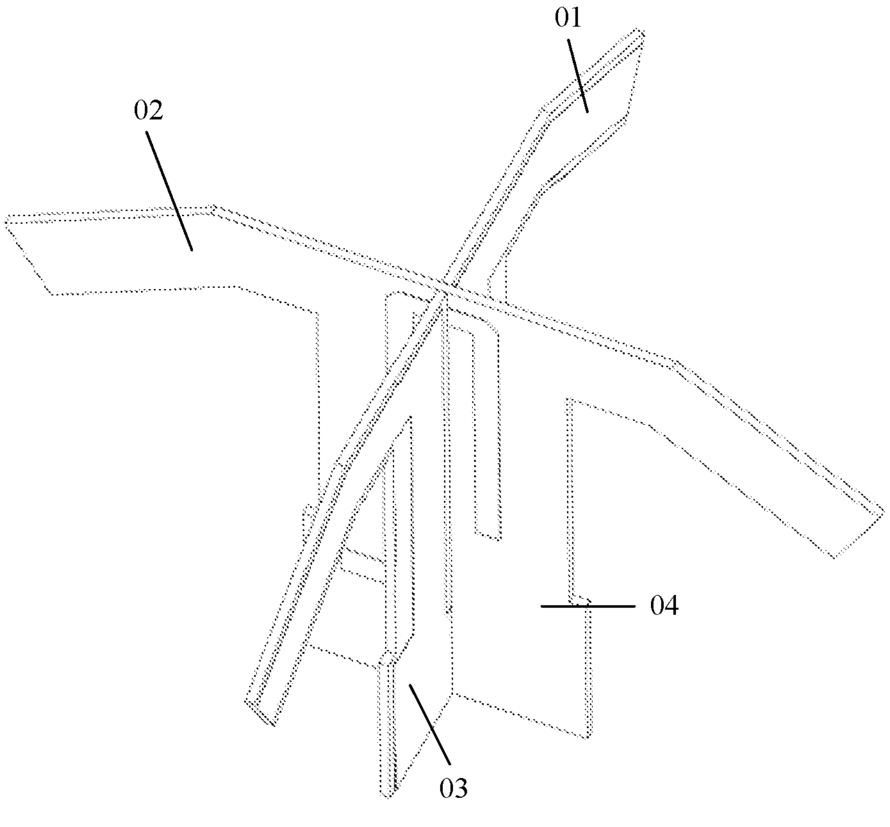
FIG. 1 (PRIOR ART)
FIG. 1 is a schematic structural diagram of a radiation apparatus according to the current technology.
Figure 2:
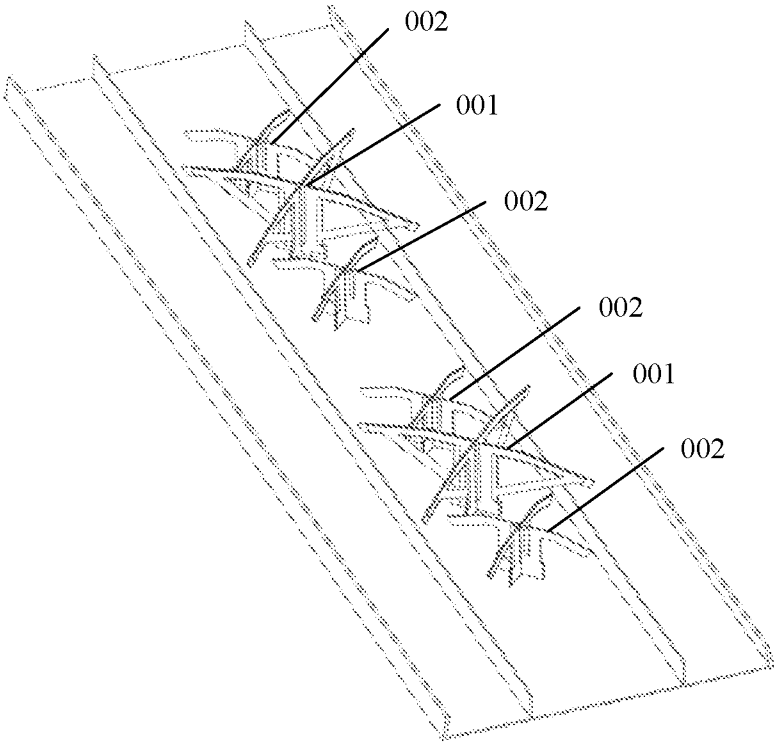
FIG. 2 (PRIOR ART)
FIG. 2 is a schematic structural diagram of a multi-band array antenna according to the current technology.
Figure 3:
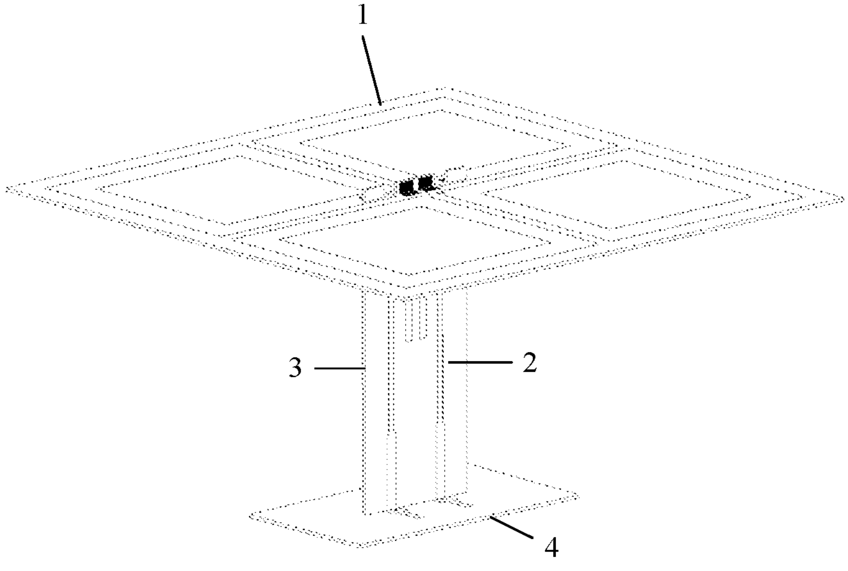
FIG. 3 is a schematic structural diagram of a first radiation apparatus according to an embodiment of this application.
Figure 4:
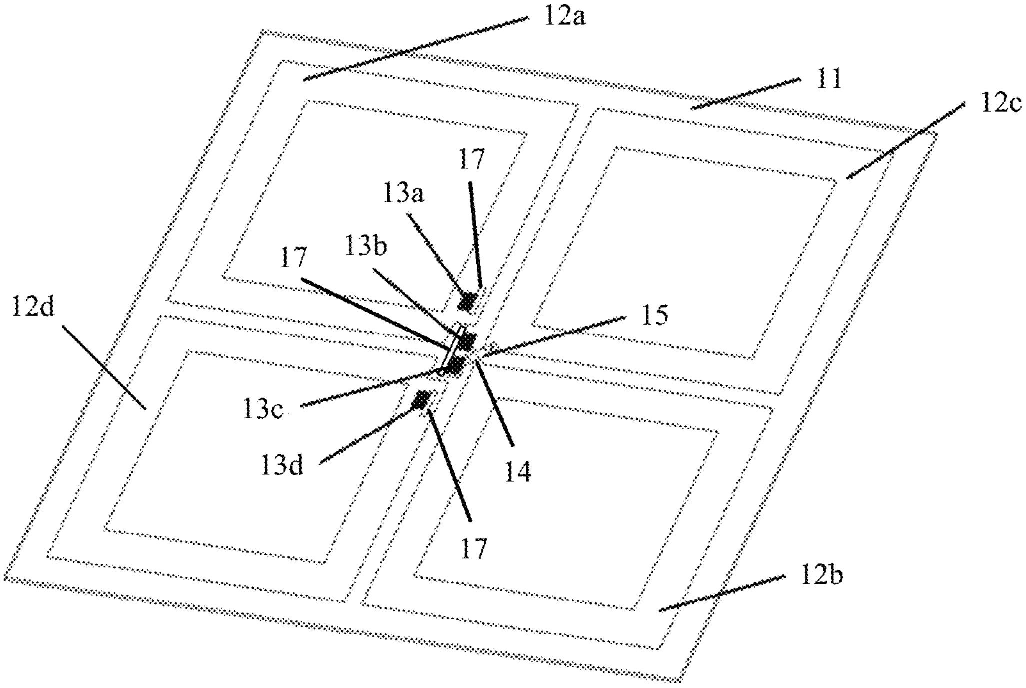
FIG. 4 is a schematic structural diagram of a radiation module in the radiation apparatus shown in FIG. 3.

According to a first aspect, as shown in FIG. 3, an embodiment of this application provides a radiation apparatus, including a radiation module 1, a first conductor balun 2, and a second conductor balun 3. The first conductor balun 2 is mechanically connected to the second conductor balun 3 under the radiation module 1. As shown in FIG. 4, the radiation module 1 includes a first radiation unit 12*a* and a second radiation unit 12*b* in a +45° polarization direction, and a third radiation unit 12*c* and a fourth radiation unit 12*d* in a −45° polarization direction. The first radiation unit 12*a*, the second radiation unit 12*b*, the third radiation unit 12*c*, and the fourth radiation unit 12*d* are isolated from each other. As shown in FIG. 3 and FIG. 4, the first conductor balun 2 is configured to feed a first differential signal to the first radiation unit 12*a* and the second radiation unit 12*b*, and the second conductor balun 3 is configured to feed a second differential signal to the third radiation unit 12*c* and the fourth radiation unit 12*d*. The first conductor balun 2 and the second conductor balun 3 are disposed in the same plane.

It should be noted that, that the first conductor balun 2 and the second conductor balun 3 are disposed in the same plane indicates that when a plurality of conductors included in the first conductor balun 2 are arranged in a plane and a plurality of conductors included in the second conductor balun 3 are also arranged in a plane, the plane in which the plurality of conductors included in the first conductor balun 2 are arranged and the plane in which the plurality of conductors included in the second conductor balun 3 are arranged are coplanar: or when a plurality of conductors included in the first conductor balun 2 are arranged in two parallel and opposite planes and a plurality of conductors included in the second conductor balun 3 are also arranged in two parallel and opposite planes, the two planes in which the plurality of conductors included in the first conductor balun 2 are arranged and the two planes in which the plurality of conductors included in the second conductor balun 3 are arranged are respectively coplanar: or when a plurality of conductors included in the first conductor balun 2 are arranged in three or more parallel and opposite planes and a plurality of conductors included in the second conductor balun 3 are also arranged in three or more parallel and opposite planes, and a quantity of planes in which the plurality of conductors included in the first conductor balun 2 are arranged is equal to a quantity of planes in which the plurality of conductors included in the second conductor balun 3 are arranged, the plurality of planes in which the plurality of conductors included in the first conductor balun 2 are arranged and the plurality of planes in which the plurality of conductors included in the second conductor balun 3 are respectively coplanar.

The first conductor balun 2 is configured to feed the first differential signal to the first radiation unit 12*a* and the second radiation unit 12*b*. For example, as shown in FIG. 4, the first conductor balun 2 is configured to feed the first differential signal to an end that is of the first radiation unit 12*a* and that is close to the second radiation unit 12*b* and an end that is of the second radiation unit 12*b* and that is close to the first radiation unit 12*a*. In other words, output ends of two paths of differential signals of the first conductor balun 2 are respectively electrically connected to the end that is of the first radiation unit 12*a* and that is close to the second radiation unit 12*b* and the end that is of the second radiation unit 12*b* and that is close to the first radiation unit 12*a*.

The second conductor balun 3 is configured to feed the second differential signal to the third radiation unit 12*c* and the fourth radiation unit 12*d*. For example, the second conductor balun 3 is configured to feed the second differential signal to an end that is of the third radiation unit 12*c* and that is close to the fourth radiation unit 12*d* and an end that is of the fourth radiation unit 12*d* and that is close to the third radiation unit 12*c*. In other words, output ends of two paths of differential signals of the second conductor balun 3 are respectively electrically connected to the end that is of the third radiation unit 12*c* and that is close to the fourth radiation unit 12*d* and the end that is of the fourth radiation unit 12*d* and that is close to the third radiation unit 12*c*.

Figure 6:
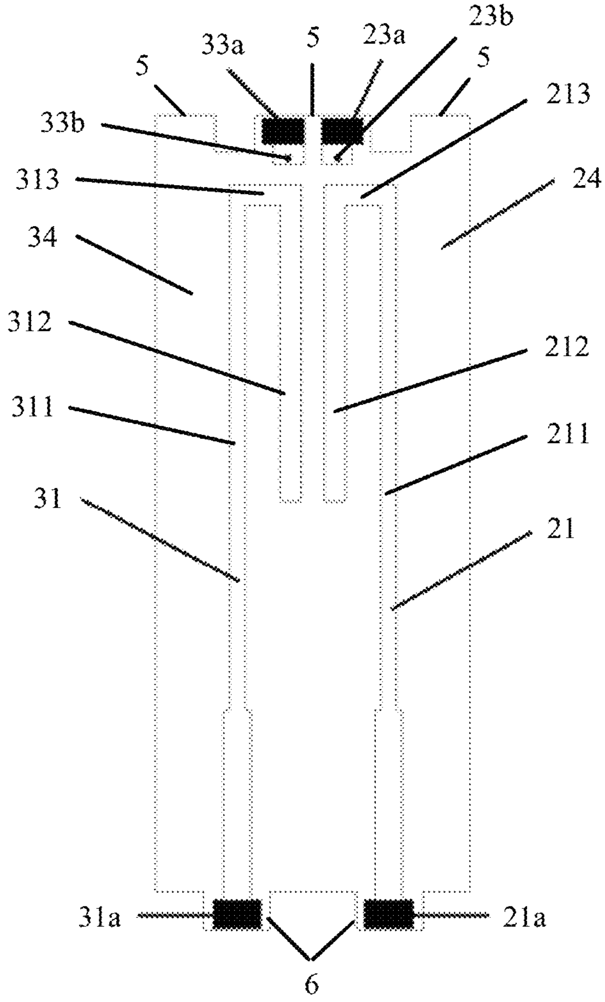
FIG. 6 is a schematic structural front view of a balun structure that includes a first conductor balun and a second conductor balun in the radiation apparatus shown in FIG. 3.

A mechanical connection between the radiation module 1 and the first conductor balun 2 and a mechanical connection between the radiation module 1 and the second conductor balun 3 may be implemented through plug-connection, threaded connection, or welding. This is not specifically limited herein. In some embodiments, as shown in FIG. 4, a first jack 17 is disposed on the radiation module 1. As shown in FIG. 6, a first plug-connection protrusion 5 is disposed on upper ends of the first conductor balun 2 and the second conductor balun 3. As shown in FIG. 3, the first plug-connection protrusion 5 is fitted into the first jack 17. In this way, the mechanical connection between the radiation module 1 and the first conductor balun 2 and the mechanical connection between the radiation module 1 and the second conductor balun 3 are implemented. For a plug-connection operation, installation efficiency is relatively high.

For the radiation apparatus provided in this embodiment of this application, as shown in FIG. 3, the radiation apparatus includes the radiation module 1, the first conductor balun 2, and the second conductor balun 3. The first conductor balun 2 and the second conductor balun 3 are disposed under the radiation module 1. As shown in FIG. 4, the radiation module 1 includes the first radiation unit 12*a* and the second radiation unit 12*b* in the +45° polarization direction, and the third radiation unit 12*c* and the fourth radiation unit 12*d* in the −45° polarization direction. As shown in FIG. 3 and FIG. 4, the first conductor balun 2 is configured to feed the first differential signal to the first radiation unit 12*a* and the second radiation unit 12*b*, and the second conductor balun 3 is configured to feed the second differential signal to the third radiation unit 12*c* and the fourth radiation unit 12*d*. The first conductor balun 2 and the second conductor balun 3 are disposed in the same plane. Therefore, a balun structure formed by the first conductor balun 2 and the second conductor balun 3 occupies relatively small space. When the radiation apparatus is applied to a multi-band antenna array, a distance between the radiation apparatus with this structure and an adjacent radiation apparatus operating on a relatively high frequency band can be further reduced. In this way, more radiation apparatuses can be integrated without increasing a size of the multi-band array antenna or through slightly increasing a size of the multi-band array antenna.

Figure 7:
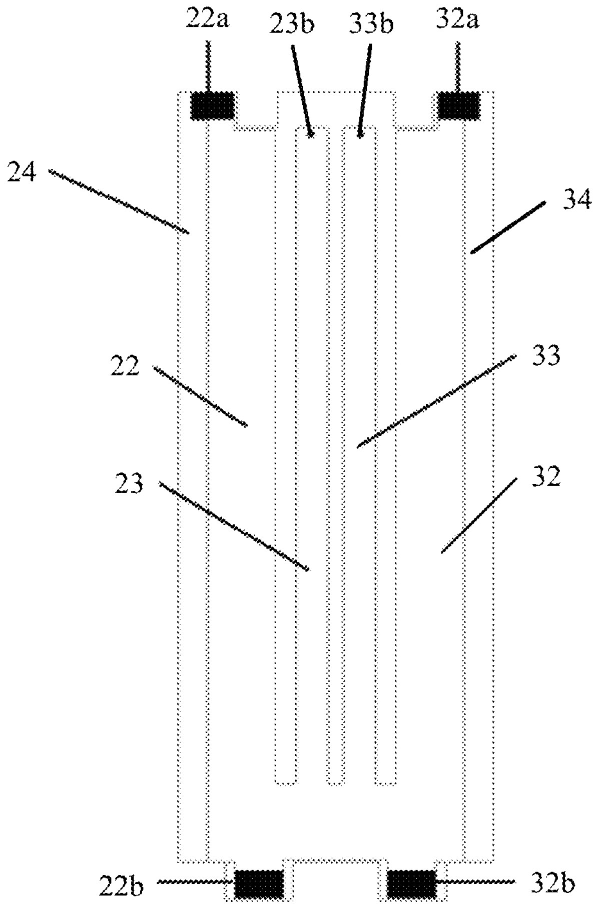
FIG. 7 is a schematic structural back view of a balun structure that includes a first conductor balun and a second conductor balun in the radiation apparatus shown in FIG. 3.

The first conductor balun 2 and the second conductor balun 3 have a plurality of structure forms. For example, the structures of the first conductor balun 2 and the second conductor balun 3 may include the following two embodiments:

Embodiment 1: As shown in FIG. 6 and FIG. 7, the first conductor balun 2 includes a feeding conductor 21, a first reference ground conductor 22, a second reference ground conductor 23, and a fastener 24. The fastener 24 is configured to fasten relative positions of the feeding conductor 21, the first reference ground conductor 22, and the second reference ground conductor 23. The feeding conductor 21 includes a first feeding conductor segment 211 and a second feeding conductor segment 212 that extend in a vertical direction. The first feeding conductor segment 211 and the second feeding conductor segment 212 are arranged in parallel. A lower end of the first feeding conductor segment 211 is a signal input end. An upper end of the second feeding conductor segment 212 is electrically connected to an upper end of the first feeding conductor segment 211. The first reference ground conductor 22 is parallel to the first feeding conductor segment 211. A capacitive coupling effect can be generated between the first reference ground conductor 22 and the first feeding conductor segment 211. A lower end of the first reference ground conductor 22 is a reference ground connection end, and an upper end of the first reference ground conductor 22 is a first signal output end. The second reference ground conductor 23 is parallel to the second feeding conductor segment 212. A capacitive coupling effect can be generated between the second reference ground conductor 23 and the second feeding conductor segment 212. A lower end of the second reference ground conductor 23 is a reference ground connection end, and an upper end of the second reference ground conductor 23 is a second signal output end. The second conductor balun 3 includes a feeding conductor 31, a first reference ground conductor 32, a second reference ground conductor 33, and a fastener 34. The fastener 34 is configured to fasten relative positions of the feeding conductor 31, the first reference ground conductor 32, and the second reference ground conductor 33. The feeding conductor 31 includes a first feeding conductor segment 311 and a second feeding conductor segment 312 that extend in a vertical direction. The first feeding conductor segment 311 and the second feeding conductor segment 312 are arranged in parallel. A lower end of the first feeding conductor segment 311 is a signal input end. An upper end of the second feeding conductor segment 312 is electrically connected to an upper end of the first feeding conductor segment 311. The first reference ground conductor 32 is parallel to the first feeding conductor segment 311. A capacitive coupling effect can be generated between the first reference ground conductor 32 and the first feeding conductor segment 311. A lower end of the first reference ground conductor 32 is a reference ground connection end, and an upper end of the first reference ground conductor 32 is a first signal output end. The second reference ground conductor 33 is parallel to the second feeding conductor segment 312. A capacitive coupling effect can be generated between the second reference ground conductor 33 and the second feeding conductor segment 312. A lower end of the second reference ground conductor 33 is a reference ground connection end, and an upper end of the second reference ground conductor 33 is a second signal output end. The first signal output end and the second signal output end of the first conductor balun 2 are respectively electrically connected to the first radiation unit 12*a* and the second radiation unit 12*b*. The first signal output end and the second signal output end of the second conductor balun 3 are respectively electrically connected to the third radiation unit 12*c* and the fourth radiation unit 12*d*. In this way, when an excitation signal (for example, a current signal) is input from the signal input end of the first conductor balun 2 to the feeding conductor 21, the excitation signal flows through the first feeding conductor segment 211 to the second feeding conductor segment 212. The excitation signal in the first feeding conductor segment 211 and the excitation signal in the second feeding conductor segment 212 are equal in size but opposite in direction. A coupled signal in the first reference ground conductor 22 and a coupled signal in the second reference ground conductor 23 are equal in size but opposite in direction. In this case, the differential signals are output from the first signal output end and the second signal output end of the first conductor balun 2. Similarly, when an excitation signal (for example, a current signal) is input from the signal input end of the second conductor balun 3 to the feeding conductor 31, the excitation signal flows through the first feeding conductor segment 311 to the second feeding conductor segment 312. The excitation signal in the first feeding conductor segment 311 and the excitation signal in the second feeding conductor segment 312 are equal in size but opposite in direction. A coupled signal in the first reference ground conductor 32 and a coupled signal in the second reference ground conductor 33 are equal in size but opposite in direction. In this case, the differential signals are output from the first signal output end and the second signal output end of the second conductor balun 3. The first conductor balun and the second conductor balun have a simple structure. In addition, a directivity pattern has relatively good symmetry.

In the foregoing embodiment, the first signal output end and the second signal output end of the first conductor balun 2 may be respectively electrically connected to the first radiation unit 12*a* and the second radiation unit 12*b* in a manner of a wire connection, a flexible circuit board connection, welding, or the like. This is not specifically limited herein. In some embodiments, as shown in FIG. 3. FIG. 4. FIG. 6, and FIG. 7, the first signal output end and the second signal output end of the first conductor balun 2 are respectively electrically connected to the first radiation unit 12*a* and the second radiation unit 12*b* in a welding manner. For example, as shown in FIG. 6 and FIG. 7, a first pad 22*a* is disposed at the first signal output end of the first conductor balun 2. The second signal output end of the first conductor balun 2 is electrically connected to a second pad 23*a* through a plated hole 23*b*. As shown in FIG. 4, a third pad 13*a* and a fourth pad 13*b* are disposed on the radiation module 1. The third pad 13*a* is electrically connected to the first radiation unit 12*a*. The fourth pad 13*b* is electrically connected to the second radiation unit 12*b*. The first pad 22*a* is welded to the third pad 13*a*. The second pad 23*a* is welded to the fourth pad 13*b*. Similarly, the first signal output end and the second signal output end of the second conductor balun 3 may be respectively electrically connected to the third radiation unit 12*c* and the fourth radiation unit 12*d* in a manner of a wire connection, a flexible circuit board connection, welding, or the like. This is not specifically limited herein. In some embodiments, as shown in FIG. 3. FIG. 4. FIG. 6, and FIG. 7, the first signal output end and the second signal output end of the second conductor balun 3 are respectively electrically connected to the third radiation unit 12*c* and the fourth radiation unit 12*d* in a welding manner. For example, as shown in FIG. 6 and FIG. 7, a fifth pad 32*a* is disposed at the first signal output end of the second conductor balun 3. The second signal output end of the second conductor balun 3 is electrically connected to a sixth pad 33*a* through a plated hole 33*b*. As shown in FIG. 4, a seventh pad 13*c* and an eighth pad 13*d* are disposed on the radiation module 1. The seventh pad 13*c* is electrically connected to the third radiation unit 12*c*. The eighth pad 13*d* is electrically connected to the fourth radiation unit 12*d*. The sixth pad 33*a* is welded to the seventh pad 13*c*. The fifth pad 32*a* is welded to the eighth pad 13*d*. Implementing an electrical connection in the welding manner brings a relatively clear appearance and a relatively reliable electrical connection.

Figure 5:
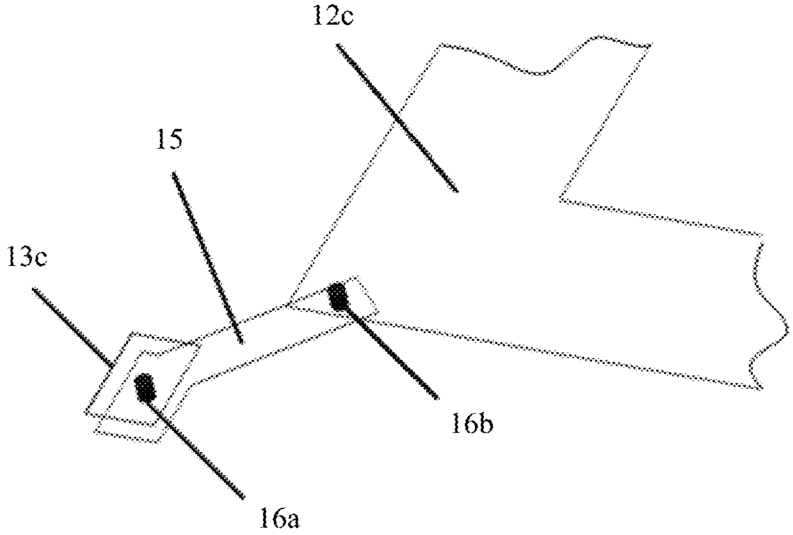
FIG. 5 is a schematic diagram of a connecting structure between a third radiation unit in the radiation module shown in FIG. 4, a fourth connection conductor, and a seventh pad.

In the foregoing embodiment, to ensure that the first conductor balun 2 and the second conductor balun 3 can accurately feed the differential signals to the radiation module 1, cross interference needs to be avoided among an electrical connection path between the third pad 13*a* and the first radiation unit 12*a*, an electrical connection path between the fourth pad 13*b* and the second radiation unit 12*b*, an electrical connection path between the seventh pad 13*c* and the third radiation unit 12*c*, and an electrical connection path between the eighth pad 13*d* and the fourth radiation unit 12*d*. To achieve this objective, in some embodiments, as shown in FIG. 4, the radiation module 1 further includes a third insulating substrate 11 that is horizontally disposed. The first radiation unit 12*a*, the second radiation unit 12*b*, the third radiation unit 12*c*, and the fourth radiation unit 12*d* are a metal layer disposed on an upper surface of the third insulating substrate 11. The third pad 13*a* is located on the first radiation unit 12*a*. The eighth pad 13*d* is located on the fourth radiation unit 12*d*. A third connection conductor 14 is disposed on the upper surface of the third insulating substrate 11. One end of the third connection conductor 14 is electrically connected to the fourth pad 13*b*, and the other end of the third connection conductor 14 is electrically connected to the second radiation unit 12*b*. A fourth connection conductor 15 is disposed on a lower surface of the third insulating substrate 11. As shown in FIG. 5, one end of the fourth connection conductor 15 is electrically connected to the seventh pad 13*c* through a plated hole 16*a* disposed in the third insulating substrate, and the other end of the fourth connection conductor 15 is electrically connected to the third radiation unit 12*c* through a plated hole 16*b* disposed in the third insulating substrate.

Figure 8:
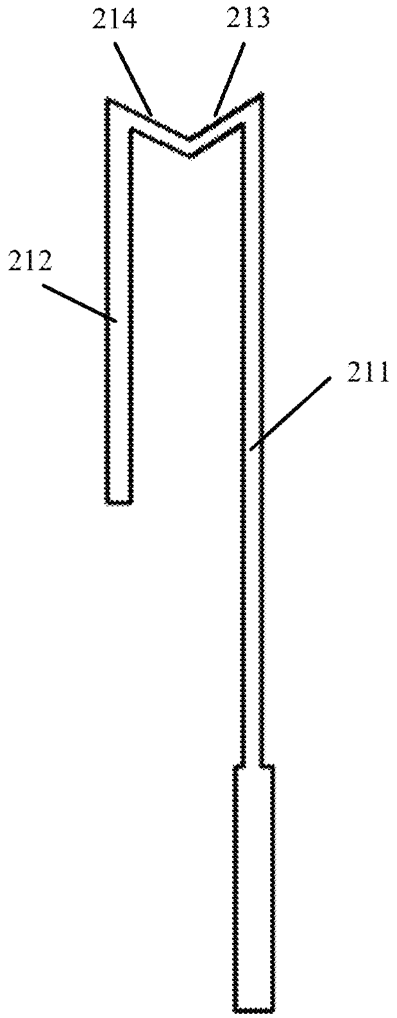
FIG. 8 is a schematic structural diagram of a feeding conductor of a first conductor balun in the radiation apparatus shown in FIG. 3.

The feeding conductor 21 of the first conductor balun 2 has a plurality of structure forms. For example, as shown in FIG. 8, the feeding conductor 21 is an M-shaped structure. To be specific, the feeding conductor 21 includes a first feeding conductor segment 211, a third feeding conductor segment 213, a fourth feeding conductor segment 214, and a second feeding conductor segment 212 that are sequentially connected. For another example, in the structure shown in FIG. 6, the feeding conductor 21 is an n-shaped structure. To be specific, the feeding conductor 21 includes a first feeding conductor segment 211, a third feeding conductor segment 213, and a second feeding conductor segment 212 that are sequentially connected, provided that the feeding conductor 21 includes the first feeding conductor segment 211 and the second feeding conductor segment 212 in which directions of excitation signals are opposite to each other. In some embodiments, as shown in FIG. 6, the feeding conductor 21 of the first conductor balun 2 further includes a third feeding conductor segment 213. The third feeding conductor segment 213 extends in a horizontal direction. One end of the third feeding conductor segment 213 is electrically connected to the upper end of the first feeding conductor segment 211, and the other end of the third feeding conductor segment 213 is electrically connected to the upper end of the second feeding conductor segment 212. In this way: the feeding conductor 21 has a simple structure with relatively low material consumption.

Figure 9:
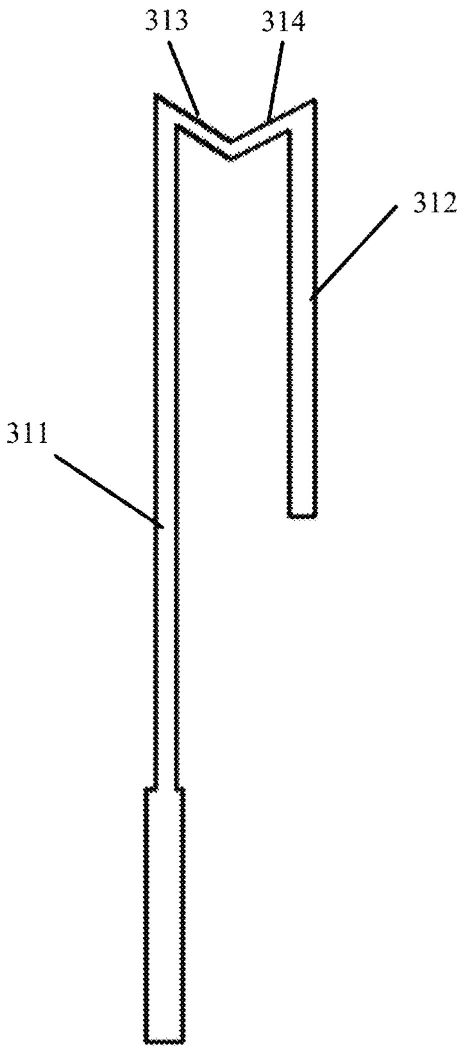
FIG. 9 is a schematic structural diagram of a feeding conductor of a second conductor balun in the radiation apparatus shown in FIG. 3.

The feeding conductor 31 of the second conductor balun 3 has a plurality of structure forms. For example, as shown in FIG. 9, the feeding conductor 31 is an M-shaped structure. To be specific, the feeding conductor 31 includes a first feeding conductor segment 311, a third feeding conductor segment 313, a fourth feeding conductor segment 314, and a second feeding conductor segment 312 that are sequentially connected. For another example, in the structure shown in FIG. 6, the feeding conductor 31 is an n-shaped structure. To be specific, the feeding conductor 31 includes a first feeding conductor segment 311, a third feeding conductor segment 313, and a second feeding conductor segment 312 that are sequentially connected, provided that the feeding conductor 31 includes the first feeding conductor segment 311 and the second feeding conductor segment 312 in which directions of excitation signals are opposite to each other. In some embodiments, as shown in FIG. 6, the feeding conductor 31 of the second conductor balun 3 further includes a third feeding conductor segment 313. The third feeding conductor segment 313 extends in a horizontal direction. One end of the third feeding conductor segment 313 is electrically connected to the upper end of the first feeding conductor segment 311, and the other end of the third feeding conductor segment 313 is electrically connected to the upper end of the second feeding conductor segment 312. In this way, the feeding conductor 31 has a simple structure with relatively low material consumption.

The plurality of conductors (including the feeding conductor 21, the first reference ground conductor 22, and the second reference ground conductor 23) included in the first conductor balun 2 may be arranged in one plane, or may be arranged in two parallel and opposite planes. This is not specifically limited herein. When the feeding conductor 21, the first reference ground conductor 22, and the second reference ground conductor 23 included in the first conductor balun 2 are arranged in one plane, the feeding conductor 21, the first reference ground conductor 22, and the second reference ground conductor 23 of the first conductor balun 2 are located in the same plane. In this case, the first conductor balun 2 has a simple structure and a simple manufacturing process. When the feeding conductor 21, the first reference ground conductor 22, and the second reference ground conductor 23 included in the first conductor balun 2 are arranged in two parallel and opposite planes, optionally, as shown in FIG. 6 and FIG. 7, the first feeding conductor segment 211 and the second feeding conductor segment 212 of the first conductor balun 2 are located in the same plane, and the plane in which the first feeding conductor segment 211 and the second feeding conductor segment 212 are located is a first plane: and the first reference ground conductor 22 and the second reference ground conductor 23 of the first conductor balun 2 are located in the same plane, and the plane in which the first reference ground conductor 22 and the second reference ground conductor 23 are located is a second plane. The first plane is parallel to and opposite to the second plane. In the first conductor balun 2 with this structure, the feeding conductor 21, the first reference ground conductor 22, and the second reference ground conductor 23 of the first conductor balun 2 are distributed in two parallel and opposite planes, to reduce a width of the first conductor balun 2. thereby further reducing space occupied by the first conductor balun 2.

The plurality of conductors (including the feeding conductor 31, the first reference ground conductor 32, and the second reference ground conductor 33) included in the second conductor balun 3 may be arranged in one plane, or may be arranged in two parallel and opposite planes. This is not specifically limited herein. When the feeding conductor 31, the first reference ground conductor 32, and the second reference ground conductor 33 included in the second conductor balun 3 are arranged in one plane, the feeding conductor 31, the first reference ground conductor 32, and the second reference ground conductor 33 of the second conductor balun 3 are located in the same plane. In this case, the second conductor balun 3 has a simple structure and a simple manufacturing process. When the feeding conductor 31, the first reference ground conductor 32, and the second reference ground conductor 33 included in the second conductor balun 3 are arranged in two parallel and opposite planes, optionally, as shown in FIG. 6 and FIG. 7, the first feeding conductor segment 311 and the second feeding conductor segment 312 of the second conductor balun 3 are located in the same plane, and the plane in which the first feeding conductor segment 311 and the second feeding conductor segment 312 are located is a sixth plane: and the first reference ground conductor 32 and the second reference ground conductor 33 of the second conductor balun 3 are located in the same plane, and the plane in which the first reference ground conductor 32 and the second reference ground conductor 33 are located is a seventh plane. The sixth plane is parallel to and opposite to the seventh plane. In the second conductor balun 3 with this structure, the feeding conductor 31, the first reference ground conductor 32, and the second reference ground conductor 33 of the second conductor balun 3 are distributed in two parallel and opposite planes, to reduce a width of the second conductor balun 3, thereby further reducing space occupied by the second conductor balun 3.

It should be noted that, to enable the first conductor balun 2 and the second conductor balun 3 to be disposed in the same plane, the first plane and the sixth plane are coplanar, and the second plane and the seventh plane are coplanar: or the first plane and the seventh plane are coplanar, and the second plane and the sixth plane are coplanar. In some embodiments, as shown in FIG. 6 and FIG. 7, the first plane and the sixth plane are coplanar, and the second plane and the seventh plane are coplanar.

In Embodiment 1, the fastener has a plurality of structure forms that may specifically include the following two optional implementations:

In a first optional implementation, as shown in FIG. 6 and FIG. 7, the fastener 24 of the first conductor balun 2 and the fastener 34 of the second conductor balun 3 are the first insulating substrate that is vertically disposed. The feeding conductor 21, the first reference ground conductor 22, and the second reference ground conductor 23 of the first conductor balun 2, and the feeding conductor 31, the first reference ground conductor 32, and the second reference ground conductor 33 of the second conductor balun 3 are metal layers disposed on the first insulating substrate. The fastener 24 and the fastener 34 with this structure have relatively small volumes. In addition, the feeding conductor 21, the first reference ground conductor 22, and the second reference ground conductor 23 of the first conductor balun 2, and the feeding conductor 31, the first reference ground conductor 32, and the second reference ground conductor 33 of the second conductor balun 3 may be formed on the first insulating substrate by using a printing process. The printing process is mature. Therefore, this structure is easy to manufacture.

Figure 13:
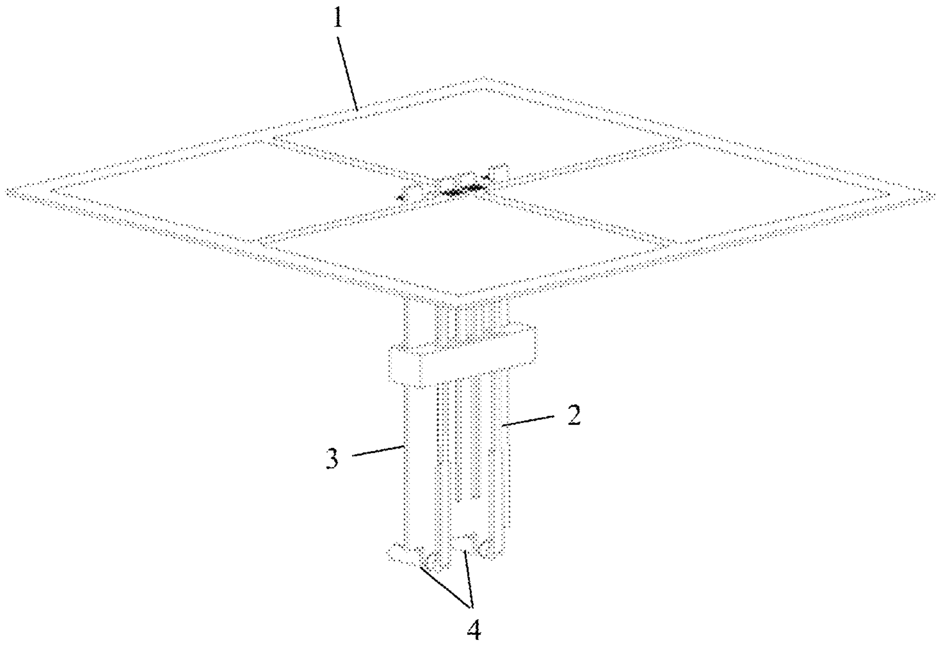
FIG. 13 is a schematic structural diagram of a second radiation apparatus according to an embodiment of this application.
Figure 14:
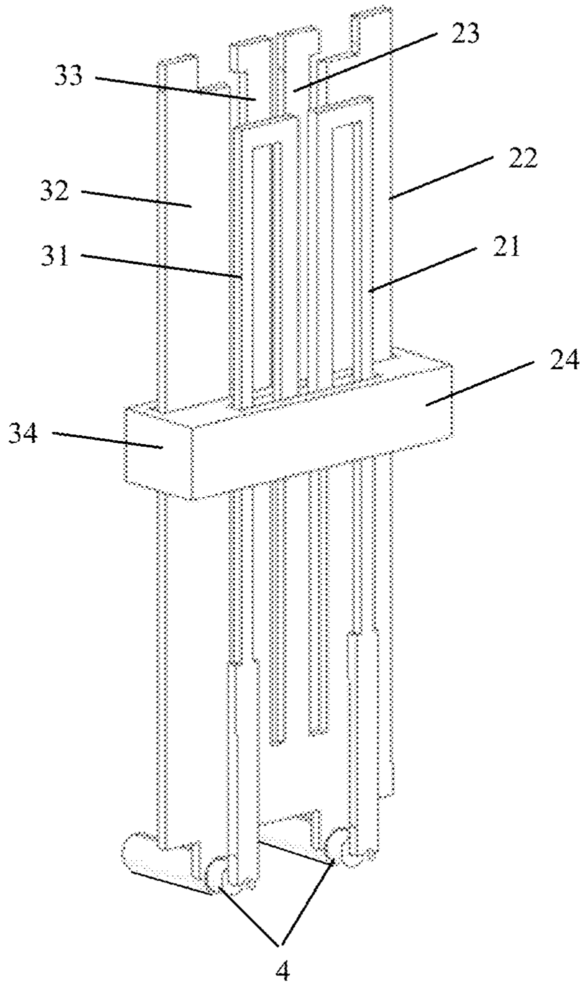
FIG. 14 is a schematic diagram of an assembled structure of a first conductor balun, a second conductor balun, and a substrate in the radiation apparatus shown in FIG. 13.
Figure 15:
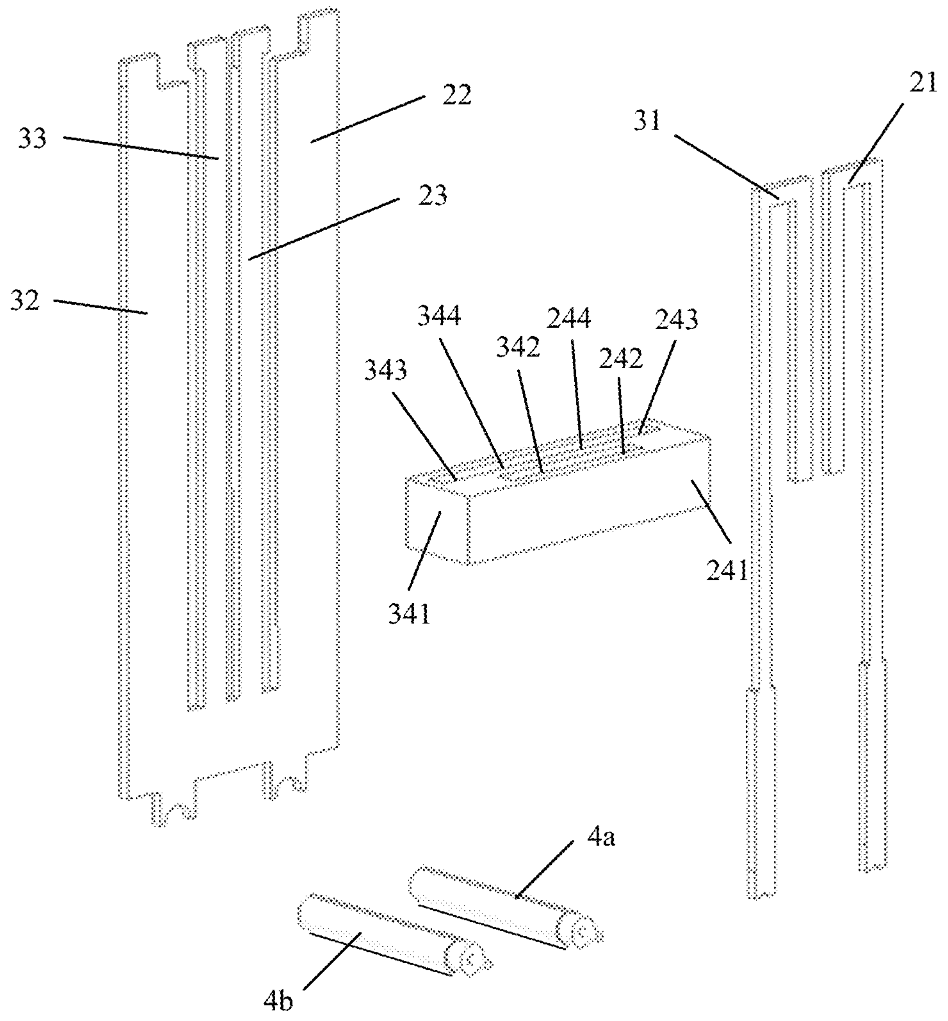
FIG. 15 is an exploded view of a first conductor balun, a second conductor balun, and a substrate in the radiation apparatus shown in FIG. 13.

In a second optional implementation, as shown in FIG. 13. FIG. 14, and FIG. 15, the fastener 24 of the first conductor balun 2 includes a fastener substrate 241. A first slot 242, a second slot 243, and a third slot 244 are disposed on the fastener substrate 241. The feeding conductor 21 is clamped in the first slot 242. The first reference ground conductor 22 is clamped in the second slot 243. The second reference ground conductor 23 is clamped in the third slot 244. In this way, the relative positions of the feeding conductor 21, the first reference ground conductor 22, and the second reference ground conductor 23 are fastened by using the fastener substrate 241 and the first slot 242, the second slot 243, and the third slot 244 that are disposed on the fastener substrate 241. A connection between the fastener substrate 241 and the feeding conductor 21, a connection between the fastener substrate 241 and the first reference ground conductor 22, and a connection between the fastener substrate 241 and the second reference ground conductor 23 are detachable. Therefore, when any one of the fastener substrate 241, the feeding conductor 21, the first reference ground conductor 22, and the second reference ground conductor 23 is damaged, the damaged component can be detached for repair or replacement. Therefore, maintenance costs are relatively low: In addition, a clamping operation is convenient, and efficiency of installation and detachment is relatively high. As shown in FIG. 13. FIG. 14, and FIG. 15, the fastener 34 of the second conductor balun 3 includes a fastener substrate 341. A first slot 342, a second slot 343, and a third slot 344 are disposed on the fastener substrate 341. The feeding conductor 31 is clamped in the first slot 342. The first reference ground conductor 32 is clamped in the second slot 343. The second reference ground conductor 33 is clamped in the third slot 344. In this way, the relative positions of the feeding conductor 31, the first reference ground conductor 32, and the second reference ground conductor 33 are fastened by using the fastener substrate 341 and the first slot 342, the second slot 343, and the third slot 344 that are disposed on the fastener substrate 341. A connection between the fastener substrate 341 and the feeding conductor 31, a connection between the fastener substrate 341 and the first reference ground conductor 32, and a connection between the fastener substrate 341 and the second reference ground conductor 33 are detachable. Therefore, when any one of the fastener substrate 341, the feeding conductor 31, the first reference ground conductor 32, and the second reference ground conductor 33 is damaged, the damaged component can be detached for repair or replacement. Therefore, maintenance costs are relatively low: In addition, a clamping operation is convenient, and efficiency of installation and detachment is relatively high.

In some embodiments, as shown in FIG. 6 and FIG. 7, or in FIG. 14 and FIG. 15, the fastener 24 of the first conductor balun 2 is formed integrally with the fastener 34 of the second conductor balun 3. In this way, a quantity of components included in the radiation apparatus can be reduced, installation efficiency can be improved, and manufacturing costs can be reduced.

Figure 12:
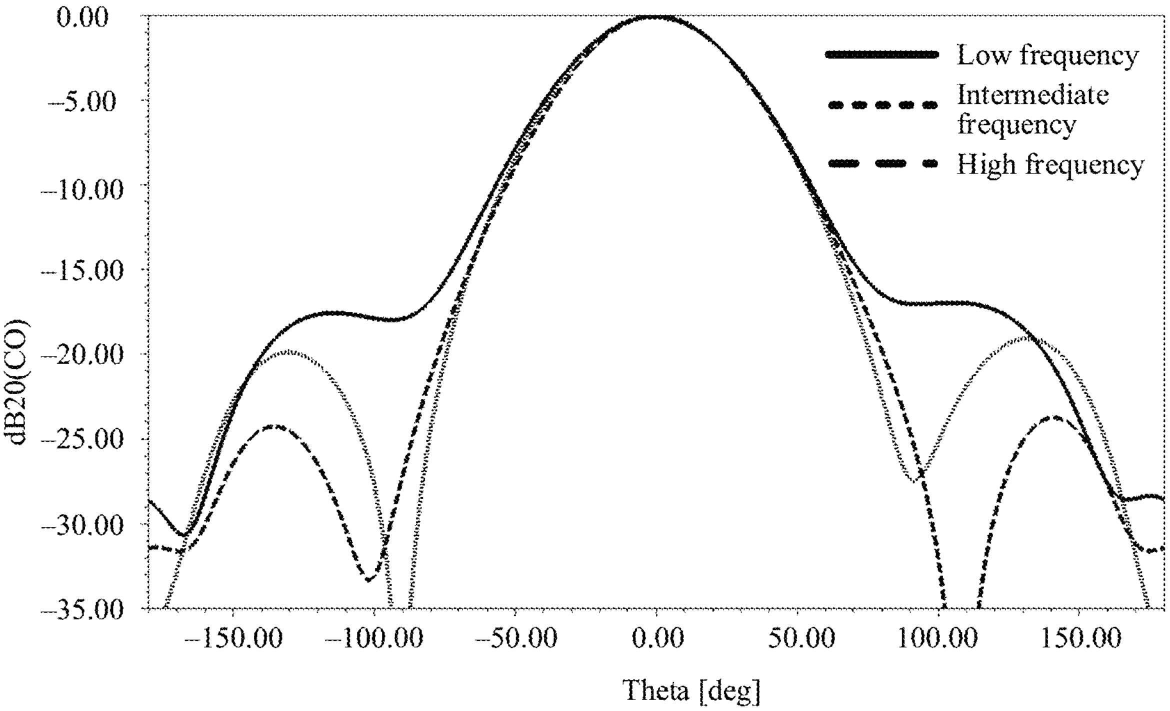
FIG. 12 is a simulation result of radiation patterns when the radiation apparatus shown in FIG. 3 respectively operates at a low frequency, an intermediate frequency, and a high frequency in a low frequency band.

To demonstrate advantages of coplanar baluns including the first conductor balun 2 and the second conductor balun 3 in Embodiment 1, a simulation experiment is performed on radiation patterns of the radiation apparatus shown in FIG. 3 that respectively operates on a low frequency (690 MHZ), an intermediate frequency (825 MHZ), and a high frequency (960 MHz) in a low frequency band (690 MHz to 960 MHZ). An obtained result is shown in FIG. 12. It can be learned from FIG. 12 that the radiation patterns of the radiation apparatus shown in FIG. 3 at the low frequency, the intermediate frequency, and the high frequency in the low frequency band are stable and consistent with no malformed change. There is no difference between the radiation pattern and a radiation pattern of a conventional radiation apparatus with noncoplanar baluns. However, the coplanar baluns with this structure applied in this application occupy smaller space.

Figure 16:
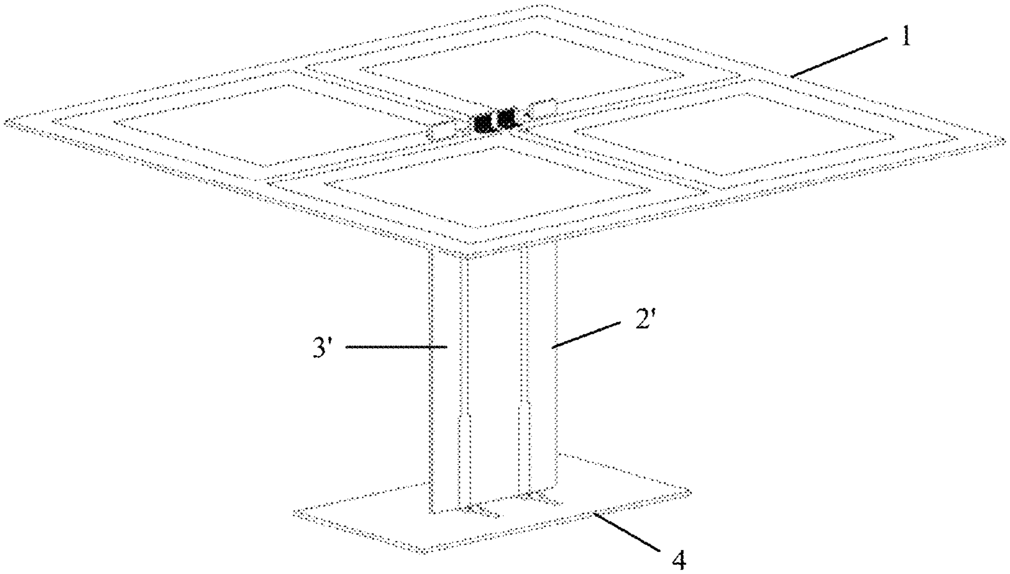
FIG. 16 is a schematic structural diagram of a third radiation apparatus according to an embodiment of this application.
Figure 17:
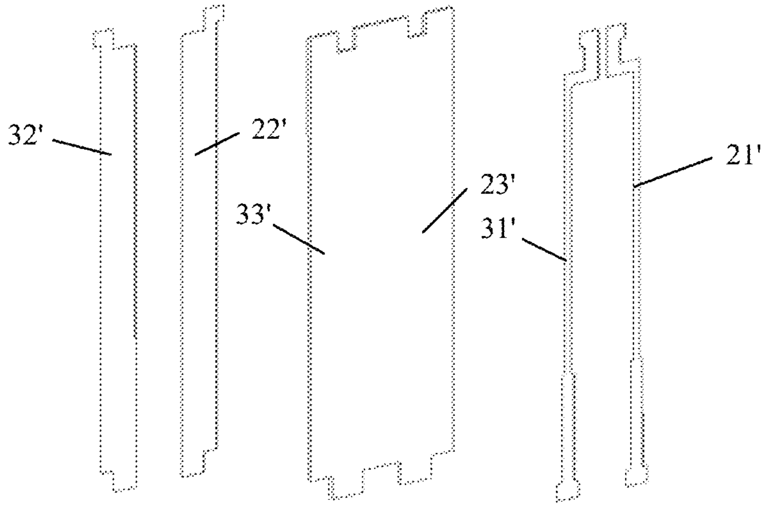
FIG. 17 is an exploded view of a first balun structure that includes a first conductor balun and a second conductor balun in the radiation apparatus shown in FIG. 16.

Embodiment 2: As shown in FIG. 16 and FIG. 17, a first conductor balun 2' includes a feeding conductor 21', a reference ground conductor 22', and a fastener 23'. The fastener 23' is configured to fasten relative positions of the feeding conductor 21' and the reference ground conductor 22'. The feeding conductor 21' extends in a vertical direction. A lower end of the feeding conductor 21' is a signal input end, and an upper end of the feeding conductor 21' is a first signal output end. The reference ground conductor 22' is parallel to the feeding conductor 21'. A capacitive coupling effect can be generated between the reference ground conductor 22' and the feeding conductor 21'. A lower end of the reference ground conductor 22' is a reference ground connection end, and an upper end of the reference ground conductor 22' is a second signal output end. A second conductor balun 3' includes a feeding conductor 31', a reference ground conductor 32', and a fastener 33'. The fastener 33' is configured to fasten relative positions of the feeding conductor 31' and the reference ground conductor 32'. The feeding conductor 31' extends in a vertical direction. A lower end of the feeding conductor 31' is a signal input end, and an upper end of the feeding conductor 31' is a first signal output end. The reference ground conductor 32' is parallel to the feeding conductor 31'. A capacitive coupling effect can be generated between the reference ground conductor 32' and the feeding conductor 31'. A lower end of the reference ground conductor 32' is a reference ground connection end, and an upper end of the reference ground conductor 32' is a second signal output end. The first signal output end and the second signal output end of the first conductor balun 2' are respectively electrically connected to the first radiation unit and the second radiation unit. The first signal output end and the second signal output end of the second conductor balun 3' are respectively electrically connected to the third radiation unit and the fourth radiation unit. In this way, when an excitation signal (for example, a current signal) is input from the signal input end of the first conductor balun 2' to the feeding conductor 21', the first signal output end at the upper end of the feeding conductor 21' may output a path of differential signal, and the second signal output end at the upper end of the reference ground conductor 22' may output the other path of differential signal, where the reference ground conductor 22' is coupled to the feeding conductor 21'. Similarly, when an excitation signal (for example, a current signal) is input from the signal input end of the second conductor balun 3' to the feeding conductor 31', the first signal output end at the upper end of the feeding conductor 31' may output a path of differential signal, and the second signal output end at the upper end of the reference ground conductor 32' may output the other path of differential signal, where the reference ground conductor 32' is coupled to the feeding conductor 31'. The first conductor balun 2' and the second conductor balun 3' have a simple structure and relatively low costs.

Figure 18:
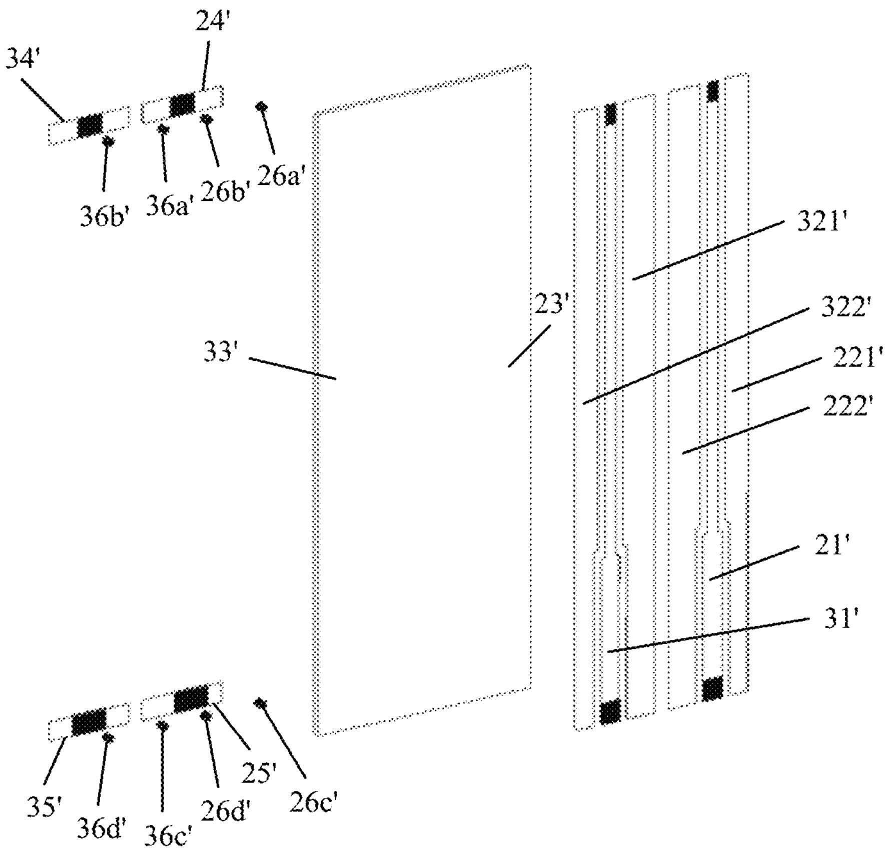
FIG. 18 is an exploded view of a second balun structure that includes a first conductor balun and a second conductor balun in the radiation apparatus shown in FIG. 16.
Figure 19:
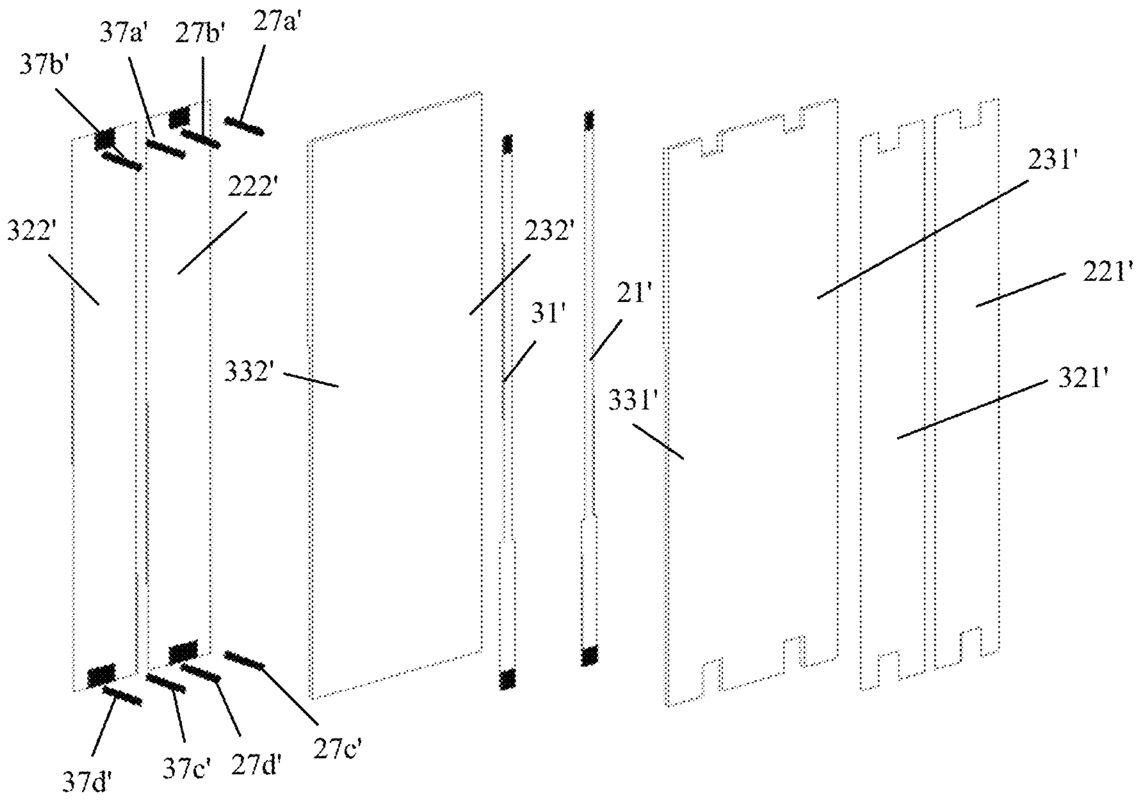
FIG. 19 is an exploded view of a third balun structure that includes a first conductor balun and a second conductor balun in the radiation apparatus shown in FIG. 16.

In some embodiments, as shown in FIG. 18 or FIG. 19, the reference ground conductor 22' of the first conductor balun 2' includes a first reference ground conductor unit 221' and a second reference ground conductor unit 222' that extend in a vertical direction. An upper end of the first reference ground conductor unit 221' is electrically connected to an upper end of the second reference ground conductor unit 222', and a lower end of the first reference ground conductor unit 221' is electrically connected to a lower end of the second reference ground conductor unit 222'. The first reference ground conductor unit 221' and the second reference ground conductor unit 222' are disposed symmetrically relative to the feeding conductor 21'. As shown in FIG. 18 or FIG. 19, the reference ground conductor 32' of the second conductor balun 3' includes a first reference ground conductor unit 321' and a second reference ground conductor unit 322' that extend in a vertical direction. An upper end of the first reference ground conductor unit 321' is electrically connected to an upper end of the second reference ground conductor unit 322', and a lower end of the first reference ground conductor unit 321' is electrically connected to a lower end of the second reference ground conductor unit 322'. The first reference ground conductor unit 321' and the second reference ground conductor unit 322' are disposed symmetrically relative to the feeding conductor 31'. In this way, symmetry of a directivity pattern can be improved.

In the foregoing embodiment, the upper end of the first reference ground conductor unit 221' of the first conductor balun 2' may be electrically connected to the upper end of the second reference ground conductor unit 222' by using a conductor, a flexible circuit board, or a plated hole. The upper end of the first reference ground conductor unit 321' of the second conductor balun 3' may be electrically connected to the upper end of the second reference ground conductor unit 322' by using a conductor, a flexible circuit board, or a plated hole. This is not specifically limited herein.

In some embodiments, as shown in FIG. 18, the fastener 23' of the first conductor balun 2' is a fourth insulating substrate that is vertically disposed. The feeding conductor 21', the first reference ground conductor unit 221', and the second reference ground conductor unit 222' are metal layers disposed on one surface of the fourth insulating substrate. A first connection conductor 24' is disposed on the other surface of the fourth insulating substrate. One end of the first connection conductor 24' is opposite to the upper end of the first reference ground conductor unit 221', and is electrically connected to the upper end of the first reference ground conductor unit 221' through a plated hole **26*a*' disposed in the fourth insulating substrate. The other end of the first connection conductor 24' is opposite to the upper end of the second reference ground conductor unit 222', and is electrically connected to the upper end of the second reference ground conductor unit 222' through a plated hole 26*b*' disposed in the fourth insulating substrate. In this way, the electrical connection between the upper end of the first reference ground conductor unit 221' and the upper end of the second reference ground conductor unit 222' of the first conductor balun 2' is implemented by using the first connection conductor 24', the plated hole 26*a*', and the plated hole 26*b*'. The fastener 33' of the second conductor balun 3' is a fourth insulating substrate that is vertically disposed. The feeding conductor 31', the first reference ground conductor unit 321', and the second reference ground conductor unit 322' are metal layers disposed on one surface of the fourth insulating substrate. A first connection conductor 34' is disposed on the other surface of the fourth insulating substrate. One end of the first connection conductor 34' is opposite to the upper end of the first reference ground conductor unit 321', and is electrically connected to the upper end of the first reference ground conductor unit 321' through a plated hole 36*a*' disposed in the fourth insulating substrate. The other end of the first connection conductor 34' is opposite to the upper end of the second reference ground conductor unit 322', and is electrically connected to the upper end of the second reference ground conductor unit 322' through a plated hole 36*b*' disposed in the fourth insulating substrate. In this way, the electrical connection between the upper end of the first reference ground conductor unit 321' and the upper end of the second reference ground conductor unit 322' of the second conductor balun 3' is implemented by using the first connection conductor 34', the plated hole 36*a*', and the plated hole 36*b*'**.

In some other embodiments, as shown in FIG. 19, the fastener 23' of the first conductor balun 2' includes a fifth insulating substrate 231' and a sixth insulating substrate 232' that are vertically disposed. The fifth insulating substrate 231' and the sixth insulating substrate 232' are stacked and are relatively fastened. The feeding conductor 21' is disposed on a surface that is of the fifth insulating substrate 231' and that is close to the sixth insulating substrate 232', or the feeding conductor 21' is disposed on a surface that is of the sixth insulating substrate 232' and that is close to the fifth insulating substrate 231'. The first reference ground conductor unit 221' is disposed on a surface that is of the fifth insulating substrate 231' and that is away from the sixth insulating substrate 232'. The second reference ground conductor unit 222' is disposed on a surface that is of the sixth insulating substrate 232' and that is away from the fifth insulating substrate 231'. The upper end of the first reference ground conductor unit 221' is electrically connected to the upper end of the second reference ground conductor unit 222' through a plated hole **27*a*' and a plated hole 27*b*' disposed in the fifth insulating substrate 231' and the sixth insulating substrate 232'. The fastener 33' of the second conductor balun 3' includes a fifth insulating substrate 331' and a sixth insulating substrate 332' that are vertically disposed. The fifth insulating substrate 331' and the sixth insulating substrate 332' are stacked and are relatively fastened. The feeding conductor 31' is disposed on a surface that is of the fifth insulating substrate 331' and that is close to the sixth insulating substrate 332', or the feeding conductor 31' is disposed on a surface that is of the sixth insulating substrate 332' and that is close to the fifth insulating substrate 331'. The first reference ground conductor unit 321' is disposed on a surface that is of the fifth insulating substrate 331' and that is away from the sixth insulating substrate 332'. The second reference ground conductor unit 322' is disposed on a surface that is of the sixth insulating substrate 332' and that is away from the fifth insulating substrate 331'. The upper end of the first reference ground conductor unit 321' is electrically connected to the upper end of the second reference ground conductor unit 322' through a plated hole 37*a*' and a plated hole 37*b*' disposed in the fifth insulating substrate 331' and the sixth insulating substrate 332'**.

The lower end of the first reference ground conductor unit 221' of the first conductor balun 2' may be electrically connected to the lower end of the second reference ground conductor unit 222' by using a conductor, a flexible circuit board, or a plated hole. The lower end of the first reference ground conductor unit 321' of the second conductor balun 3' may be electrically connected to the lower end of the second reference ground conductor unit 322' by using a conductor, a flexible circuit board, or a plated hole. This is not specifically limited herein.

In some embodiments, as shown in FIG. 18, the fastener 23' of the first conductor balun 2' is a fourth insulating substrate that is vertically disposed. The feeding conductor 21', the first reference ground conductor unit 221', and the second reference ground conductor unit 222' are metal layers disposed on one surface of the fourth insulating substrate. A second connection conductor 25' is disposed on the other surface of the fourth insulating substrate. One end of the second connection conductor 25' is opposite to the lower end of the first reference ground conductor unit 221', and is electrically connected to the lower end of the first reference ground conductor unit 221' through a plated hole 26*c*' disposed in the fourth insulating substrate. The other end of the second connection conductor 25' is opposite to the lower end of the second reference ground conductor unit 222', and is electrically connected to the lower end of the second reference ground conductor unit 222' through a plated hole 26*d*' disposed in the fourth insulating substrate. In this way, the electrical connection between the lower end of the first reference ground conductor unit 221' and the lower end of the second reference ground conductor unit 222' of the first conductor balun 2' is implemented by using the second connection conductor 25', the plated hole 26*c*', and the plated hole 26*d*'. The fastener 33' of the second conductor balun 3' is a fourth insulating substrate that is vertically disposed. The feeding conductor 31', the first reference ground conductor unit 321', and the second reference ground conductor unit 322' are metal layers disposed on one surface of the fourth insulating substrate. A second connection conductor 35' is disposed on the other surface of the fourth insulating substrate. One end of the second connection conductor 35' is opposite to the lower end of the first reference ground conductor unit 321', and is electrically connected to the lower end of the first reference ground conductor unit 321' through a plated hole 36*c*' disposed in the fourth insulating substrate. The other end of the second connection conductor 35' is opposite to the lower end of the second reference ground conductor unit 322', and is electrically connected to the lower end of the second reference ground conductor unit 322' through a plated hole 36*d*' disposed in the fourth insulating substrate. In this way, the electrical connection between the lower end of the first reference ground conductor unit 321' and the lower end of the second reference ground conductor unit 322' of the first conductor balun 3' is implemented by using the second connection conductor 35', the plated hole 36*c*', and the plated hole 36*d'*.

In some other embodiments, as shown in FIG. 19, the fastener 23' of the first conductor balun 2' includes a fifth insulating substrate 231' and a sixth insulating substrate 232' that are vertically disposed. The fifth insulating substrate 231' and the sixth insulating substrate 232' are stacked and are relatively fastened. The feeding conductor 21' is disposed on a surface that is of the fifth insulating substrate **23*l*' and that is close to the sixth insulating substrate 232', or the feeding conductor 21' is disposed on a surface that is of the sixth insulating substrate 232' and that is close to the fifth insulating substrate 231'. The first reference ground conductor unit 221' is disposed on a surface that is of the fifth insulating substrate 231' and that is away from the sixth insulating substrate 232'. The second reference ground conductor unit 222' is disposed on a surface that is of the sixth insulating substrate 232' and that is away from the fifth insulating substrate 231'. The lower end of the first reference ground conductor unit 221' is electrically connected to the lower end of the second reference ground conductor unit 222' through a plated hole 27***c*' and a plated hole 27*d*' disposed in the fifth insulating substrate 231' and the sixth insulating substrate 232'. The fastener 33' of the second conductor balun 3' includes a fifth insulating substrate 331' and a sixth insulating substrate 332' that are vertically disposed. The fifth insulating substrate 331' and the sixth insulating substrate 332' are stacked and are relatively fastened. The feeding conductor 31' is disposed on a surface that is of the fifth insulating substrate 331' and that is close to the sixth insulating substrate 332', or the feeding conductor **3*l*' is disposed on a surface that is of the sixth insulating substrate 332' and that is close to the fifth insulating substrate 331'. The first reference ground conductor unit 321' is disposed on a surface that is of the fifth insulating substrate 33*l*' and that is away from the sixth insulating substrate 332'. The second reference ground conductor unit 322' is disposed on a surface that is of the sixth insulating substrate 332' and that is away from the fifth insulating substrate 331'. The lower end of the first reference ground conductor unit 321' is electrically connected to the lower end of the second reference ground conductor unit 322' through a plated hole 37***c*' and a plated hole 37*d*' disposed in the fifth insulating substrate 331' and the sixth insulating substrate 332'.

The plurality of conductors (including the feeding conductor 21', the first reference ground conductor unit 221', and the second reference ground conductor unit 222') included in the first conductor balun 2' may be arranged in one plane, or may be arranged in three parallel and opposite planes. This is not specifically limited herein. When the feeding conductor 21', the first reference ground conductor unit 221', and the second reference ground conductor unit 222' included in the first conductor balun 2' are arranged in one plane, as shown in FIG. 18, the feeding conductor 21', the first reference ground conductor 221', and the second reference ground conductor 222' of the first conductor balun 2' are all strip conductors: and the feeding conductor 21', the first reference ground conductor 221', and the second reference ground conductor 222' are disposed in the same plane. In this case, the first conductor balun 2' has a simple structure and a simple manufacturing process. When the feeding conductor 21', the first reference ground conductor unit 221', and the second reference ground conductor unit 222' included in the first conductor balun 2' are arranged in three parallel and opposite planes, optionally, as shown in FIG. 19, the feeding conductor 21', the first reference ground conductor 221', and the second reference ground conductor 222' of the first conductor balun 2' are all strip conductors. A plane in which the feeding conductor 21' is located is a third plane. A plane in which the first reference ground conductor unit 221' is located is a fourth plane. A plane in which the second reference ground conductor unit 222' is located is a fifth plane. The fourth plane and the fifth plane are respectively located on two opposite sides of the third plane, and the fourth plane and the fifth plane are both parallel to and opposite to the third plane. In the first conductor balun 2' with this structure, the feeding conductor 21', the first reference ground conductor unit 221', and the second reference ground conductor unit 222' of the first conductor balun 2' are distributed in three planes, to reduce a width of the first conductor balun 2', thereby further reducing space occupied by the first conductor balun 2'.

The plurality of conductors (including the feeding conductor 31', the first reference ground conductor unit 321', and the second reference ground conductor unit 322') included in the second conductor balun 3' may be arranged in one plane, or may be arranged in three parallel and opposite planes. This is not specifically limited herein. When the feeding conductor 31', the first reference ground conductor unit 321', and the second reference ground conductor unit 322' included in the second conductor balun 3' are arranged in one plane, as shown in FIG. 18, the feeding conductor 31', the first reference ground conductor 321', and the second reference ground conductor 322' of the second conductor balun 3' are all strip conductors: and the feeding conductor 31', the first reference ground conductor 321', and the second reference ground conductor 322' are disposed in the same plane. In this case, the second conductor balun 3' has a simple structure and a simple manufacturing process. When the feeding conductor 31', the first reference ground conductor unit 321', and the second reference ground conductor unit 322' included in the second conductor balun 3' are arranged in three parallel and opposite planes, optionally, as shown in FIG. 19, the feeding conductor 31', the first reference ground conductor 321', and the second reference ground conductor 322' of the second conductor balun 3' are all strip conductors. A plane in which the feeding conductor 31' is located is an eighth plane. A plane in which the first reference ground conductor unit 321' is located is a ninth plane. A plane in which the second reference ground conductor unit 322' is located is a tenth plane. The ninth plane and the tenth plane are respectively located on two opposite sides of the eighth plane, and the ninth plane and the tenth plane are both parallel to and opposite to the eighth plane. In the second conductor balun 3' with this structure, the feeding conductor 31', the first reference ground conductor unit 321', and the second reference ground conductor unit 322' of the second conductor balun 3' are distributed in three planes, to reduce a width of the second conductor balun 3', thereby further reducing space occupied by the second conductor balun 3'.

It should be noted that, to enable the first conductor balun 2' and the second conductor balun 3' to be disposed in the same plane, the third plane and the eighth plane are coplanar, the fourth plane and the ninth plane are coplanar, and the fifth plane and the tenth plane are coplanar: or the third plane and the eighth plane are coplanar, the fourth plane and the tenth plane are coplanar, and the fifth plane and the ninth plane are coplanar.

In some embodiments, as shown in FIG. 18 or FIG. 19, the fastener 23' of the first conductor balun 2' is formed integrally with the fastener 33' of the second conductor balun 3'. In this way, a quantity of components included in the radiation apparatus can be reduced, installation efficiency can be improved, and manufacturing costs can be reduced.

Figure 10:
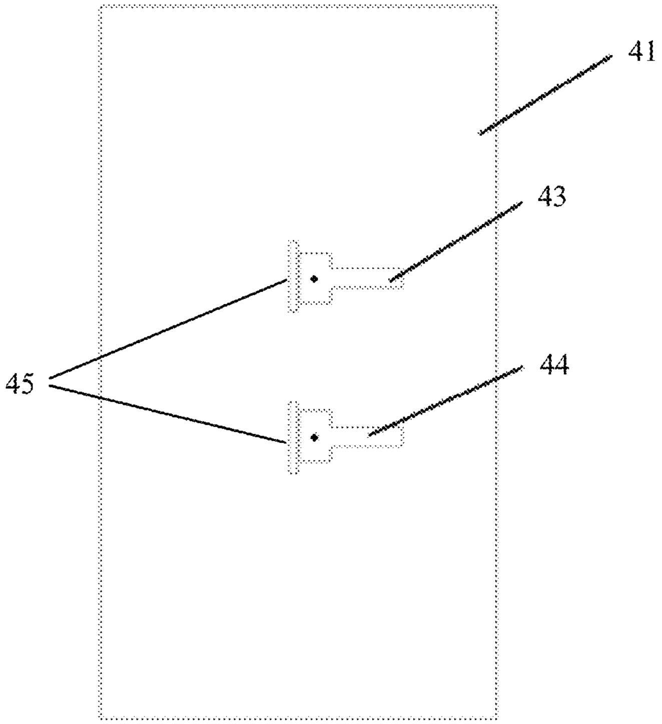
FIG. 10 is a schematic structural diagram of an upper surface of a substrate in the radiation apparatus shown in FIG. 3.
Figure 11:
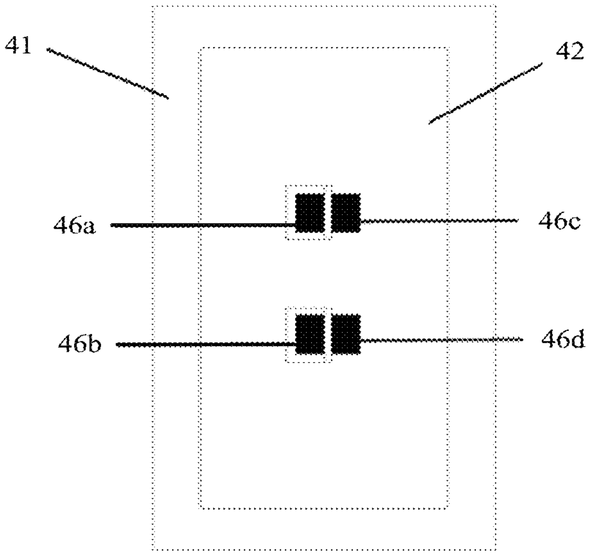
FIG. 11 is a schematic structural diagram of a lower surface of a substrate in the radiation apparatus shown in FIG. 3.

In some embodiments, as shown in FIG. 3, the radiation apparatus further includes a substrate 4. The substrate 4 is mechanically connected to lower ends of the first conductor balun 2 and the second conductor balun 3. As shown in FIG. 10 and FIG. 11, the substrate 4 includes a reference ground 42, a first feeding terminal 43, and a second feeding terminal 44 that are isolated from each other. The reference ground connection end of the first conductor balun 2 and the reference ground connection end of the second conductor balun 3 are both electrically connected to the reference ground 42. The signal input end of the first conductor balun 2 is electrically connected to the first feeding terminal 43. The signal input end of the second conductor balun 3 is electrically connected to the second feeding terminal 44. In this way, the first conductor balun 2, the second conductor balun 3, and the radiation module 1 can be supported by using the substrate 4. In addition, the first feeding terminal 43 and the second feeding terminal 44 are disposed on the substrate 4, to facilitate access of a feeding cable. In the foregoing embodiment, the electrical connection between the reference ground 42 and each of the reference ground connection end of the first conductor balun 2 and the reference ground connection end of the second conductor balun 3, the electrical connection between the signal input end of the first conductor balun 2 and the first feeding terminal 43, and the electrical connection between the signal input end of the second conductor balun 3 and the second feeding terminal 44 may be implemented in a manner of a wire connection, a flexible circuit board connection, welding, or the like. This is not specifically limited herein. In some embodiments, as shown in FIG. 7, a ninth pad **22*b* is disposed at the reference ground connection end of the first conductor balun 2, a tenth pad 32*b* is disposed at the reference ground connection end of the second conductor balun 3, an eleventh pad 21*a* is disposed at the signal input end of the first conductor balun 2, and a twelfth pad 31*a* is disposed at the signal input end of the second conductor balun 3. As shown in FIG. 11, a thirteenth pad 46*c*, a fourteenth pad 46*d*, a fifteenth pad 46*a*, and a sixteenth pad 46*b* are disposed on the substrate 4. The thirteenth pad 46*c* and a fourteenth pad 46*d* are both electrically connected to the reference ground. The fifteenth pad 46*a* is electrically connected to the first feeding terminal 43 through a plated hole. The sixteenth pad 46*b* is electrically connected to the second feeding terminal 44 through a plated hole. The ninth pad 22*b* is welded to the thirteenth pad 46*c*. The tenth pad 32*b* is welded to the fourteenth pad 46*d*. The eleventh pad 21*a* is welded to the fifteenth pad 46*a*. The twelfth pad 31*a* is welded to the sixteenth pad 46*b***.

To facilitate a welding operation, the thirteenth pad **46*c*, the fourteenth pad 46*d*, the fifteenth pad 46*a*, and the sixteenth pad 46*b* are disposed on the same surface of the substrate 4. In this way, during welding, the welding operation of the four pads can be implemented with no need to flip the substrate 4**.

A mechanical connection between the substrate 4 and the first conductor balun 2 and a mechanical connection between the substrate 4 and the second conductor balun 3 may be implemented through plug-connection, threaded connection, or welding. This is not specifically limited herein. In some embodiments, as shown in FIG. 10, a second jack 45 is disposed on the substrate 4. As shown in FIG. 6, a second plug-connection protrusion 6 is disposed on the lower ends of the first conductor balun 2 and the second conductor balun 3. The second plug-connection protrusion 6 is fitted into the second jack 45. Therefore, the mechanical connection between the first conductor balun 2 and the substrate 4 and the mechanical connection between the second conductor balun 3 and the substrate 4 are implemented. For a plug-connection operation, installation efficiency is relatively high.

In some embodiments, as shown in FIG. 3. FIG. 10, and FIG. 11, the substrate 4 further includes a second insulating substrate 41 that is horizontally disposed. The reference ground 42 is a metal layer disposed on one surface of an upper surface and a lower surface of the second insulating substrate 41. The first feeding terminal 43 and the second feeding terminal 44 are metal layers disposed on the other surface of the upper surface and the lower surface of the second insulating substrate 41. In this way, the first feeding terminal 43, the second feeding terminal 44, and the reference ground 42 are isolated from each other by using the second insulating substrate 41. In addition, the reference ground 42, the first feeding terminal 43, and the second feeding terminal 44 may be formed on the second insulating substrate 41 by using a printing process. The printing process is mature. Therefore, this structure is easy to manufacture.

In some other embodiments, as shown in FIG. 13, FIG. 14, and FIG. 15, the substrate 4 includes a first coaxial feeder 4*a* and a second coaxial feeder 4*b*. The first coaxial feeder 4*a* is located below the first conductor balun 2. The second coaxial feeder 4*b* is located below the second conductor balun 3. The reference ground is an external conductor of the first coaxial feeder 4*a* and an external conductor of the second coaxial feeder 4*b*. The first feeding terminal is an inner conductor of the first coaxial feeder 4*a*. The second feeding terminal is an inner conductor of the second coaxial feeder 4*b*. The structure is simple and is easy to implement.

In some embodiments, as shown in FIG. 4, the radiation module 1 further includes a third insulating substrate 11 that is horizontally disposed. The first radiation unit 12*a*, the second radiation unit 12*b*, the third radiation unit 12*c*, and the fourth radiation unit 12*d* are a metal layer disposed on an upper surface of the third insulating substrate 11. The radiation module 1 with this structure has a relatively small volume. The first radiation unit 12*a*, the second radiation unit 12*b*, the third radiation unit 12*c*, and the fourth radiation unit 12*d* may be formed on the third insulating substrate 11 by using a printing process. The printing process is mature. Therefore, this structure is easy to manufacture.

Figure 20:
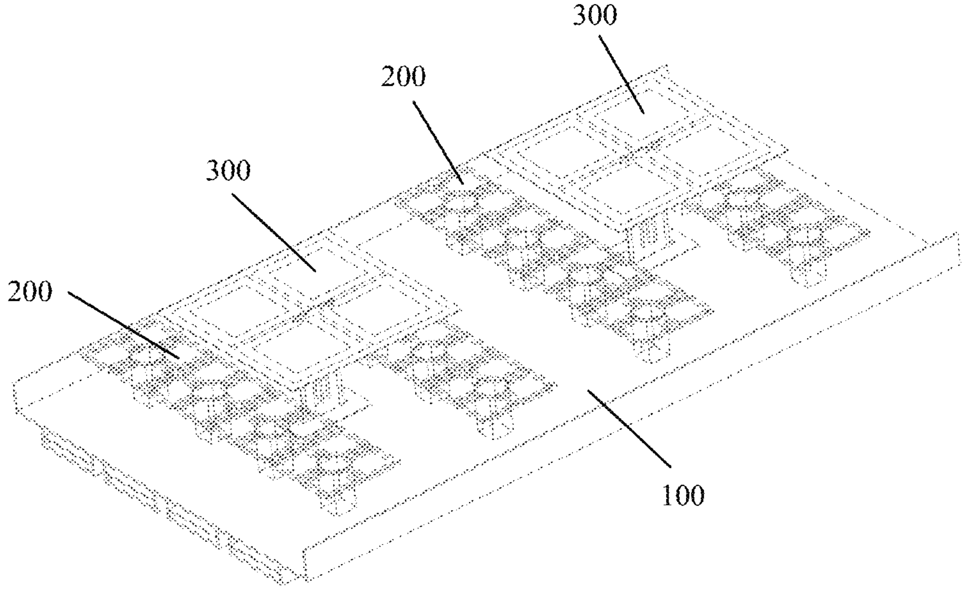
FIG. 20 is a three-dimensional diagram of a multi-band array antenna according to an embodiment of this application.
Figure 21:
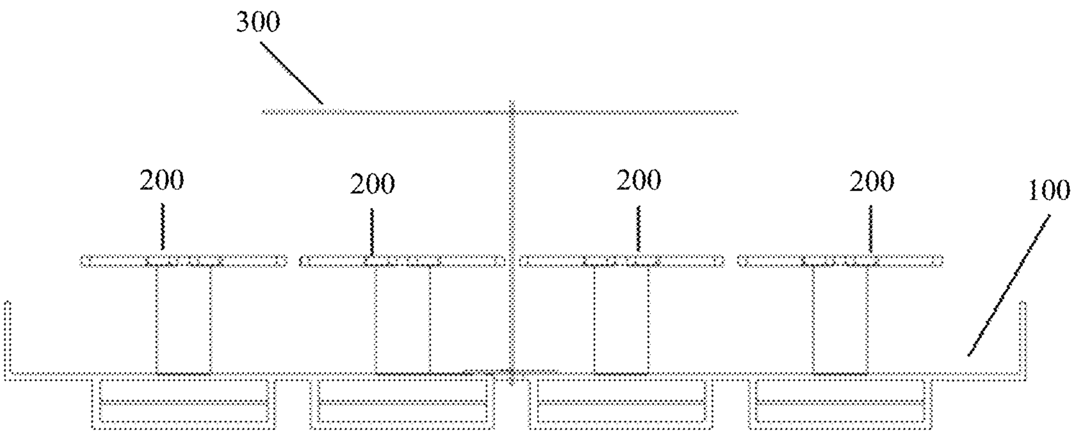
FIG. 21 is a main view of a multi-band array antenna according to an embodiment of this application.

According to a second aspect, as shown in FIG. 20 and FIG. 21, an embodiment of this application provides a multi-band array antenna, including a reflection panel 100 and a radiation apparatus array disposed on the reflection panel 100. The radiation apparatus array includes a first radiation apparatus 200 and a second radiation apparatus 300 that are disposed adjacent to each other. A frequency band in which the first radiation apparatus 200 operates is higher than a frequency band in which the second radiation apparatus 300 operates. The second radiation apparatus 300 is the radiation apparatus described in any one of the foregoing technical solutions.

For the multi-band array antenna provided in this embodiment of this application, as shown in FIG. 20 and FIG. 21, the multi-band array antenna includes the reflection panel 100 and the radiation apparatus array disposed on the reflection panel 100. The radiation apparatus array includes the first radiation apparatus 200 and the second radiation apparatus 300 that are disposed adjacent to each other. The frequency band in which the first radiation apparatus 200 operates is higher than the frequency band in which the second radiation apparatus 300 operates. Therefore, a volume of the first radiation apparatus 200 is smaller than a volume of the second radiation apparatus 300. Baluns of the first radiation apparatus 200 and the second radiation apparatus 300 are aligned with each other. Because the second radiation apparatus 300 is the radiation apparatus described in any one of the foregoing technical solutions, a first conductor balun and a second conductor balun of the second radiation apparatus 300 are disposed in the same plane. A balun structure formed by the first conductor balun and the second conductor balun occupies relatively small space, to facilitate reduction of a distance between the first radiation apparatus 200 and the second radiation apparatus 300. Therefore, more radiation apparatuses can be integrated without increasing a size of the multi-band array antenna or through slightly increasing a size of the multi-band array antenna.

In the descriptions of this specification, the described specific features, structures, materials, or characteristics may be combined in a proper manner in any one or more of the embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A radiation apparatus, comprising:

a radiation module, a first balun, and a second balun;

the radiation module comprises a first radiation unit and a second radiation unit that are arranged in a +45° polarization direction, and a third radiation unit and a fourth radiation unit that are arranged in a −45° polarization direction; and the first balun is configured to feed a first differential signal to the first radiation unit and the second radiation unit, the second balun is configured to feed a second differential signal into the third radiation unit and the fourth radiation unit, and the first balun and the second balun are disposed in a same plane;

wherein the first balun and the second balun each comprise a feeding conductor, a first reference ground conductor, a second reference ground conductor, and a fastener, wherein the fastener is configured to fasten relative positions of the feeding conductor, the first reference ground conductor and the second reference ground conductor;

the feeding conductor comprises a first feeding conductor segment and a second feeding conductor segment that extend in a first direction, the first feeding conductor segment and the second feeding conductor segment are arranged in parallel, a lower end of the first feeding conductor segment is a signal input end, and an upper end of the second feeding conductor segment is electrically connected to an upper end of the first feeding conductor segment;

the first reference ground conductor is parallel to the first feeding conductor segment, a capacitive coupling effect can be generated between the first reference ground conductor and the first feeding conductor segment, a lower end of the first reference ground conductor is a reference ground connection end, and an upper end of the first reference ground conductor is a first signal output end;

the second reference ground conductor is parallel to the second feeding conductor segment, a capacitive coupling effect can be generated between the second reference ground conductor and the second feeding conductor segment, a lower end of the second reference ground conductor is a reference ground connection end, and an upper end of the second reference ground conductor is a second signal output end; and the first signal output end and the second signal output end of the first balun are respectively electrically connected to the first radiation unit and the second radiation unit, and the first signal output end and the second signal output end of the second balun are respectively electrically connected to the third radiation unit and the fourth radiation unit.

2. The radiation apparatus according to claim 1, wherein the feeding conductor further comprises a third feeding conductor segment, the third feeding conductor segment extends in a second direction perpendicular to the first direction, one end of the third feeding conductor segment is electrically connected to the upper end of the first feeding conductor segment, and another end of the third feeding conductor segment is electrically connected to the upper end of the second feeding conductor segment.

3. The radiation apparatus according to claim 1, wherein the first feeding conductor segment and the second feeding conductor segment are located in a first plane, the first reference ground conductor and the second reference ground conductor are located in a second plane, and the first plane is parallel to and opposite to the second plane.

4. The radiation apparatus according to claim 3, wherein the fastener is a first insulating substrate that is disposed in the first direction, the feeding conductor, the first reference ground conductor, and the second reference ground conductor are metal layers disposed on the first insulating substrate.

5. The radiation apparatus according to claim 3, wherein the fastener comprises a fastener substrate, a first slot, a second slot, and a third slot are disposed on the fastener substrate, the feeding conductor is clamped in the first slot, the first reference ground conductor is clamped in the second slot, and the second reference ground conductor is clamped in the third slot.

6. The radiation apparatus according to claim 1, wherein the feeding conductor, the first reference ground conductor, and the second reference ground conductor are located in the same plane.

7. The radiation apparatus according to claim 1, further comprising a substrate, wherein the substrate is mechanically connected to lower ends of the first balun and the second balun, and the substrate comprises a reference ground, a first feeding terminal, and a second feeding terminal that are isolated from each other; and the reference ground connection end of the first balun and the reference ground connection end of the second balun are both electrically connected to the reference ground, a signal input end of the first balun is electrically connected to the first feeding terminal, and a signal input end of the second balun is electrically connected to the second feeding terminal.

8. The radiation apparatus according to claim 7, wherein the substrate further comprises a second insulating substrate that is disposed along a second direction perpendicular to the first direction, the reference ground is a metal layer disposed on one surface of an upper surface and a lower surface of the second insulating substrate, and the first feeding terminal and the second feeding terminal are metal layers disposed on the other another surface of the upper surface and the lower surface of the second insulating substrate.

9. The radiation apparatus according to claim 7, wherein the substrate comprises a first coaxial feeder and a second coaxial feeder, the first coaxial feeder is located below the first balun, the second coaxial feeder is located below the second balun, the reference ground is an external conductor of the first coaxial feeder and an external conductor of the second coaxial feeder, the first feed terminal is an inner conductor of the first coaxial feeder, and the second feeding terminal is an inner conductor of the second coaxial feeder.

10. The radiation apparatus according to claim 1, wherein the radiation module further comprises a third insulating substrate that is disposed along a second direction, and the first radiation unit, the second radiation unit, the third radiation unit, and the fourth radiation unit are a metal layer disposed on an upper surface of the third insulating substrate.

11. The radiation apparatus according to claim 1, wherein the first radiation unit, the second radiation unit, the third radiation unit and the fourth radiation unit are isolated from each other.

12. A multi-band array antenna, comprising:

a reflection panel and a radiation apparatus array disposed on the reflection panel, wherein the radiation apparatus array comprises a first radiation apparatus and a second radiation apparatus that are disposed adjacent to each other, a frequency band in which the first radiation apparatus operates is higher than a frequency band in which the second radiation apparatus operates, and the second radiation apparatus comprises a radiation module, a first balun, and a second balun, wherein the first balun is connected to the second balun on one side of the radiation module;

the radiation module comprises a first radiation unit and a second radiation unit that are arranged in a +45° polarization direction, and a third radiation unit and a fourth radiation unit that are arranged in a −45° polarization direction; and the first balun is configured to feed a first differential signal to the first radiation unit and the second radiation unit, the second balun is configured to feed a second differential signal into the third radiation unit and the fourth radiation unit, and the first balun and the second balun are disposed in a same plane;

wherein the first balun and the second balun each comprise a feeding conductor, a first reference ground conductor, a second reference ground conductor, and a fastener, wherein the fastener is configured to fasten relative positions of the feeding conductor, the first reference ground conductor and the second reference ground conductor;

the feeding conductor comprises a first feeding conductor segment and a second feeding conductor segment that extend in a first direction, the first feeding conductor segment and the second feeding conductor segment are arranged in parallel, a lower end of the first feeding conductor segment is a signal input end, and an upper end of the second feeding conductor segment is electrically connected to an upper end of the first feeding conductor segment;

the first reference ground conductor is parallel to the first feeding conductor segment, a capacitive coupling effect can be generated between the first reference ground conductor and the first feeding conductor segment, a lower end of the first reference ground conductor is a reference ground connection end, and an upper end of the first reference ground conductor is a first signal output end;

the second reference ground conductor is parallel to the second feeding conductor segment, a capacitive coupling effect can be generated between the second reference ground conductor and the second feeding conductor segment, a lower end of the second reference ground conductor is a reference ground connection end, and an upper end of the second reference ground conductor is a second signal output end; and the first signal output end and the second signal output end of the first balun are respectively electrically connected to the first radiation unit and the second radiation unit, and the first signal output end and the second signal output end of the second balun are respectively electrically connected to the third radiation unit and the fourth radiation unit.

13. The multi-band array antenna according to claim 12, wherein the first radiation unit, the second radiation unit, the third radiation unit and the fourth radiation unit are isolated from each other.

* * * * *